(12) United States Patent
Fuhse et al.

(10) Patent No.: US 11,511,559 B2
(45) Date of Patent: Nov. 29, 2022

(54) OPTICALLY VARIABLE SECURITY ELEMENT

(71) Applicant: GIESECKE+EVRIENT CURRENCY TECHNOLOGY GMBH, Munich (DE)

(72) Inventors: Christian Fuhse, Otterfing (DE); Astrid Heine, Kirchheim (DE); Martin Imhof, Munich (DE); Angelika Keck-Angerer, Munich (DE); Walter Dörfler, Munich (DE); Peter Franz, Pienzenau/Bruck (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/535,368

(22) PCT Filed: Dec. 2, 2015

(86) PCT No.: PCT/EP2015/002417
§ 371 (c)(1),
(2) Date: Jun. 12, 2017

(87) PCT Pub. No.: WO2016/020066
PCT Pub. Date: Feb. 11, 2016

(65) Prior Publication Data
US 2017/0326900 A1    Nov. 16, 2017

(30) Foreign Application Priority Data

Dec. 12, 2014  (DE) .......................... 102014018512.5

(51) Int. Cl.
*B42D 25/342* (2014.01)
*B42D 25/324* (2014.01)
(Continued)

(52) U.S. Cl.
CPC .......... *B42D 25/342* (2014.10); *B42D 25/29* (2014.10); *B42D 25/324* (2014.10);
(Continued)

(58) Field of Classification Search
CPC .................................................... B42D 25/342
See application file for complete search history.

(56) References Cited

U.S. PATENT DOCUMENTS 5,428,479 A * 6/1995 Lee ...................... G02B 5/1842
359/558
5,437,897 A * 8/1995 Tanaka ..................... B41M 3/14
428/29

(Continued)

FOREIGN PATENT DOCUMENTS

AU    2012331447 A1   5/2014
CA       2421501 A1   3/2003
(Continued)

OTHER PUBLICATIONS

International Search Report for corresponding International PCT Application No. PCT/EP2015/002417, dated Mar. 10, 2016.

(Continued)

*Primary Examiner* — David R Dunn
*Assistant Examiner* — Christopher E Veraa
(74) *Attorney, Agent, or Firm* — Workman Nydegger

(57) ABSTRACT

The present invention relates to an optically variable security element for securing valuable articles, having a substrate having opposing first and second main surfaces and, arranged on the first main surface, an optically variable pattern that comprises an embossing pattern and a coating. The coating comprises at least one imprinted line grid and a background layer that contrasts with the line grid. The embossing pattern comprises a two-dimensional grid of elevated and/or depressed embossing elements. Both are (Continued)

combined in such a way that substantially on every embossing element lies at least one line segment of a line in the line grid, and at least one of the parameters position of the line segment on the embossing element, orientation of the line segment on the embossing element and form of the line segment varies location dependently across the dimension of the optically variable pattern. Due to the line grid, a movement effect, especially a pump or rotation effect, is created when the security element is tilted.

32 Claims, 10 Drawing Sheets

(51) Int. Cl.
    *B42D 25/29*     (2014.01)
    *B42D 25/351*     (2014.01)
    *B42D 25/425*     (2014.01)
    *B42D 25/435*     (2014.01)
    *G02B 17/00*     (2006.01)
    *B42D 25/23*     (2014.01)
    *B42D 25/24*     (2014.01)
    *B42D 25/26*     (2014.01)

(52) U.S. Cl.
    CPC ......... *B42D 25/351* (2014.10); *B42D 25/425* (2014.10); *B42D 25/435* (2014.10); *G02B 17/002* (2013.01); *B42D 25/23* (2014.10); *B42D 25/24* (2014.10); *B42D 25/26* (2014.10)

(56) References Cited

U.S. PATENT DOCUMENTS

| | | | |
|---|---|---|---|
| 5,582,103 A | 12/1996 | Tanaka et al. | |
| 6,381,071 B1* | 4/2002 | Dona | G02B 3/0031 359/455 |
| 7,686,341 B2 | 3/2010 | Adamczyk et al. | |
| 7,808,710 B2 | 10/2010 | Hansen et al. | |
| 8,100,436 B2 | 1/2012 | Heine et al. | |
| 8,149,511 B2 | 4/2012 | Kaule et al. | |
| 8,632,100 B2 | 1/2014 | Kaule et al. | |
| 8,642,161 B2 | 2/2014 | Kuntz et al. | |
| 9,770,934 B2 | 9/2017 | Schilling et al. | |
| 2002/0012447 A1* | 1/2002 | Amidror | G07D 7/128 382/100 |
| 2005/0180020 A1* | 8/2005 | Steenblik | G02B 27/2214 359/626 |
| 2005/0240549 A1 | 10/2005 | Adamczyk et al. | |
| 2006/0280331 A1* | 12/2006 | Chosson | G07D 7/0032 382/100 |
| 2007/0058260 A1* | 3/2007 | Steenblik | B42D 25/29 359/626 |
| 2007/0246932 A1 | 10/2007 | Heine et al. | |
| 2008/0024846 A1 | 1/2008 | Tompkin et al. | |
| 2008/0258456 A1* | 10/2008 | Rahm | G02B 5/1861 283/85 |
| 2008/0290647 A1 | 11/2008 | Adamczyk et al. | |
| 2009/0008923 A1 | 1/2009 | Kaule et al. | |
| 2009/0290221 A1 | 11/2009 | Hansen et al. | |
| 2009/0324104 A1* | 12/2009 | Cheung | G02B 27/60 382/224 |
| 2011/0045248 A1* | 2/2011 | Hoffmuller | B41M 1/04 428/156 |
| 2012/0098249 A1* | 4/2012 | Rahm | B42D 25/324 283/85 |
| 2012/0146323 A1 | 6/2012 | Schilling et al. | |
| 2013/0044362 A1* | 2/2013 | Commander | G02B 27/2214 359/291 |
| 2013/0063826 A1* | 3/2013 | Hoffmuller | B44C 1/1737 359/619 |
| 2013/0099474 A1* | 4/2013 | Fuhse | B42D 15/00 283/85 |
| 2014/0175785 A1 | 6/2014 | Kaule et al. | |
| 2014/0191500 A1* | 7/2014 | Holmes | B42D 25/342 283/85 |
| 2014/0225362 A1* | 8/2014 | Quinn | B42D 25/425 283/85 |
| 2015/0151562 A1* | 6/2015 | Whiteman | G02B 5/124 283/85 |
| 2015/0328916 A1* | 11/2015 | Waldhauser | B42D 25/29 283/72 |
| 2016/0101643 A1* | 4/2016 | Cape | G02B 3/0043 359/627 |
| 2016/0167422 A1* | 6/2016 | Brehm | G02B 5/1809 359/567 |
| 2019/0176507 A1* | 6/2019 | Lister | B42D 25/29 |

FOREIGN PATENT DOCUMENTS

| | | |
|---|---|---|
| CA | 2642330 A1 | 8/2007 |
| CA | 2707728 A1 | 6/2009 |
| CN | 1452561 A | 10/2003 |
| CN | 1671562 A | 9/2005 |
| CN | 1989529 A | 6/2007 |
| CN | 103140881 A | 6/2013 |
| CN | 101421118 B | 9/2013 |
| CN | 104023991 A | 9/2014 |
| DE | 102006029536 A1 | 12/2007 |
| DE | 102006032660 A1 | 1/2008 |
| DE | 102009032697 B3 | 10/2010 |
| DE | 102013000152 A1 | 7/2014 |
| DE | 102013021806 A1 | 6/2015 |
| EP | 0177933 A2 | 4/1986 |
| EP | 0581414 A1 | 2/1994 |
| EP | 0581414 B2 | 6/2004 |
| EP | 1182054 B1 | 5/2009 |
| EP | 1779335 B1 | 10/2010 |
| EP | 2562726 A1 | 2/2013 |
| EP | 2594149 A1 | 5/2013 |
| EP | 2684703 A1 | 1/2014 |
| EP | 2562726 A4 | 3/2014 |
| EP | 2684703 B1 | 6/2016 |
| JP | H05339900 A | 12/1993 |
| JP | 2007223308 A | 9/2007 |
| JP | 2014083721 A | 5/2014 |
| RU | 2011108930 A | 9/2012 |
| RU | 2465147 C1 | 10/2012 |
| RU | 2527184 C2 | 8/2014 |
| WO | 2007076952 A2 | 7/2007 |
| WO | 2009000528 A1 | 12/2008 |
| WO | 2009139396 A1 | 11/2009 |
| WO | 2010015382 A2 | 2/2010 |
| WO | 2010015383 A1 | 2/2010 |
| WO | 2010075979 A1 | 7/2010 |
| WO | 2011051668 A1 | 5/2011 |
| WO | 2012024718 A1 | 3/2012 |
| WO | 2012153106 A1 | 11/2012 |
| WO | 2013056825 A1 | 4/2013 |

OTHER PUBLICATIONS

Chinese Search Report from CN Application No. 2015800734756, dated May 3, 2018.
European Office Communication from EP Application No. 15812954. 4, dated May 28, 2018.
Russian Search Report from RU Application No. 2017124615/12, dated Feb. 12, 2015.
Chinese Search Report from corresponding CN Application No. 2015800734756, dated Apr. 24, 2018.
European Search Report from corresponding EP Application No. 19000427, dated Nov. 18, 2019.
Brazilian Search Report from corresponding BR Application No. 112017012334-7, dated Apr. 24, 2018.
Indian Examination Report from corresponding IN Application No. 201737017956, dated Jun. 2, 2020.
Chinese Search Report from corresponding CN Application No. 2019111049813, dated Jul. 23, 2020.

(56) References Cited

OTHER PUBLICATIONS

Japanese Office Action from corresponding JP Application No. 2017530114, dated Apr. 19, 2021.

* cited by examiner

OPTICALLY VARIABLE SECURITY ELEMENT

BACKGROUND

The present invention relates to an optically variable security element for securing valuable articles, having a substrate having opposing first and second main surfaces and, arranged on the first main surface, an optically variable pattern that comprises an embossing pattern and a coating. The invention also relates to a method for manufacturing such a security element, and a data carrier that is equipped accordingly.

For protection, data carriers, such as value or identification documents, or other valuable articles, such as branded articles, are often provided with security elements that permit the authenticity of the data carriers to be verified, and that simultaneously serve as protection against unauthorized reproduction.

Security elements having viewing-angle-dependent effects play a special role in safeguarding authenticity, as these cannot be reproduced even with the most modern copiers. Here, the security elements are furnished with optically variable elements that, from different viewing angles, convey to the viewer a different image impression and, depending on the viewing angle, display for example another color or brightness impression and/or another graphic motif.

In addition to tilt images, also other security elements are known in the background art that present to a viewer direction-dependently different depictions in that corresponding micro-image elements are enlarged with the aid of microlenses. Examples of such security elements include so-called moiré magnification arrangements and other micro-optical depiction arrangements. Since, in said security elements, besides a grid composed of microimages, also a grid aligned in perfect register and composed of microlenses, concave mirrors or aperture masks must be produced, such micro-optical depiction arrangements place considerable technological demands on the manufacturing process and cannot be used economically for all types of valuable articles, or be combined with other security features.

Proceeding from this, the object of the present invention is to specify an optically variable security element of the kind cited above that avoids the disadvantages of the background art, and especially to create a security element that is easy and economical to manufacture and that, when tilted, displays visually appealing movement effects and that, ideally, is easily combinable with other security features of a data carrier.

Said object is solved by the features of the independent claims. Developments of the present invention are the subject of the dependent claims.

According to the present invention, in a generic security element, it is provided that
 the coating comprises at least one imprinted line grid and one background layer that contrasts with the line grid,
 the embossing pattern comprises a two-dimensional grid of elevated and/or depressed embossing elements,
 the coating and the embossing pattern are combined in such a way that substantially on every embossing element lies at least one line segment of a line in the line grid, and
 at least one of the parameters 'position of the line segment on the embossing element', 'orientation of the line segment on the embossing element' and 'form of the line segment' varies location dependently across the dimension of the optically variable pattern such that, due to the line grid, a movement effect, especially a pump or rotation effect, is created when the security element is tilted.

Within the scope of the present description, for the sake of simplicity, instead of "the at least one line grid," often only "the line grid" is mentioned. It is understood that this is not intended to preclude the coating comprising more than one line grid. The statements made then apply in each case for at least one, but typically even for all line grids in the coating. Especially in the case of multiple line grids, the coating and the embossing pattern are combined in such a way that, for at least one, but preferably for all line grids, substantially on every embossing element lies at least one line segment of a line in the line grid. In the same way, at least one of the parameters mentioned varies location dependently across the dimension of the optically variable pattern in such a way that, due to at least one, but preferably all line grids, a movement effect is created when the security element is tilted. The same applies also for the embodiments described below having at least one further line grid below the background layer or having a second coating having at least one imprinted line grid. Here, too, by way of abbreviation, only "the" line grid is referenced, also when multiple or all line grids are meant.

The line grid can be imprinted on the contrasting background layer, which in this case is preferably applied contiguously in the region of the optically variable pattern. Alternatively, the line grid can first be imprinted and the contrasting background layer then applied with appropriate gaps, or the line grid can be exposed after the application of the contrasting background layer by removing said background layer in some regions, and in this way reveal the view of the line grid. The background layer and the line grid can also be applied edge to edge next to each other. In all cases, the background layer forms a visual background for the movement effect produced by the line grid.

The contrasting background layer is advantageously formed by a highly reflective background layer, especially by a glossy silver, gold- or copper-colored foil or a metallic-seeming printing layer, for example a silver-, gold- or copper-colored printing layer, but also metallized, especially metallic evaporated, foil strips or patches may be used as the background layer. As the metallic coating material, especially aluminum can be used. Optionally, the metallic-seeming printing layer and the vapor-deposited metal layer can be provided on an adhesion-promoting layer, for example a glossy adhesion-promoting layer (primer) applied in screen printing. The silver-, gold- or copper-colored printing layer can especially be applied in screen printing or flexo printing or also as an offset ink.

The effects described are particularly well visible when a directly reflecting background layer having a high gloss value is used.

Due to the highly reflective background layer, each embossing element advantageously acts as a small concave or convex mirror. With respect to the resulting movement direction when the security element is tilted, concave and convex mirrors have a reversed effect.

In other, likewise advantageous embodiments, the contrasting background layer is formed by a colored, especially monochrome (e.g. white) background layer, a glossy background layer, such as a glossy adhesion-promoting layer, with or without pigments or fillers, applied in screen printing, or the opaque or glossy surface of the substrate of the security element itself. If the contrasting background layer is not a highly reflective layer, the line grid is advantageously imprinted with high areal density.

The substrate can be opaque or also transparent or at least translucent in the region of the optically variable pattern arranged on the first main surface. If the substrate is transparent or translucent there, then the optically variable pattern can be viewed both from the first main surface and from the second main surface. The security element then advantageously comprises a two-sided design in which a movement effect becomes visible in each case when viewed from opposing sides. This can be the same movement effect, if applicable with a different-colored appearance, but also different movement effects, for example a tilt effect when viewed from the first main surface and a rotation effect when viewed from the second main surface.

A transparent or translucent region in the substrate can be formed, for example, by a transparent polymer region in an otherwise opaque polymer substrate, by a hybrid substrate having a transparent hybrid window, by a transparent polymer substrate having partial opaque ink-receiving layers, or by a through opening in an arbitrary substrate, especially a paper substrate that is covered with a transparent, printable foil strip or patch.

If the substrate is transparent or translucent at least in the region of the optically variable pattern arranged on the first main surface, then in one advantageous embodiment, the coating comprises, for one thing, the line grid already mentioned as the first line grid, which in this embodiment is arranged on the background layer. For another thing, the coating comprises at least one further line grid that is arranged below the background layer and contrasts with the background layer. Here, substantially on every embossing element lies at least one line segment of a line in the further line grid, and for the further line grid, at least one of the parameters 'position of the line segment on the embossing element', 'orientation of the line segment on the embossing element' and 'form of the line segment' varies location-dependently across the dimension of the optically variable pattern such that, due to the further line grid, a movement effect, especially a pump or rotation effect, is created when the security element is tilted.

In this embodiment, the line grids arranged on the background layer and the line grids arranged below the background layer use the same embossing pattern and the same background layer. Here, the background layer is advantageously developed to be opaque, especially highly reflective, and includes no gaps, at least in the regions of the applied line grids, to avoid crosstalk of the visible information on opposing sides.

In a further possibility for realizing two-sided designs, it is provided that the optically variable pattern arranged on the first main surface is combined with a second optically variable pattern arranged on the second main surface of the substrate. The second optically variable pattern comprises a second embossing pattern and a second coating, the second embossing pattern being developed to be congruent but inverse to the first embossing pattern of the first main surface, the second coating comprising at least one imprinted line grid, the second coating and the second embossing pattern being combined in such a way that substantially on every embossing element of the second embossing pattern lies at least one line segment of a line in the line grid of the second coating, and for the line grid of the second coating, at least one of the parameters 'position of the line segment on the embossing element', 'orientation of the line segment on the embossing element' and 'form of the line segment' varying location dependently across the dimension of the optically variable pattern such that, due to the line grid of the second coating, a movement effect, especially a pump or rotation effect, is created when the security element is tilted.

Here, advantageously, the embossing pattern of the second main surface is produced in the same production step simultaneously with the embossing pattern of the first main surface, for example by a blind embossing with an intaglio printing unit. For example, in the embossing step, the first main surface of the substrate can face the embossing plate, while the second main surface is in contact with a back-pressure blanket. Then, due to production conditions, besides the embossing patterns on the first main surface, deformations will also be produced on the second main surface that, according to the present invention, are utilized as reverse-side embossing patterns. Here, the embossing patterns of the second main surface are produced congruently and with the same pattern repeat as the embossing patterns of the first main surface, but they have an inverse geometry to the embossing patterns of the first main surface. This means that, in each case, in relation to the surface, a depression on the second main surface corresponds to an elevation on the first main surface and vice versa. Due to the back-pressure blanket used, the embossing patterns of the second main surface normally have an increased roughness compared with the embossing patterns of the first main surface.

Here, the second coating can include only the line grids mentioned and utilize the background layer of the first optically variable pattern for the contrast or reflection effect. Alternatively, the second coating can additionally comprise a second background layer that contrasts with the line grid, which can especially be developed to be highly reflective. For the application and arrangement of the second background layer on the second main surface, the statements made for the first background layer apply accordingly. The first and second background layer can be developed to be identical or different.

To produce, in addition to the movement effect(s) that are perceptible in top view, a piece of see-through information in the security element, the contrasting background layer or, in the event that two contrasting background layers are provided, at least one of the contrasting background layers is advantageously perforated with point- or line-shaped gaps or omitted in large areas. In the perforated or omitted regions, also the line grids imprinted on the background layer can be omitted. As described in greater detail below, the line grids can be modified, for example in their color, in large-area gaps. The gaps can especially be produced by removing in some regions an already applied background layer through laser impingement, or also by merely applying the background layer in some regions.

In advantageous embodiments, the embossing elements are formed by elevated or depressed round structures, especially by compressed hemispherical or aspherical structures or calottes ("fly's eye arrays"). The base area of the embossing elements is preferably circular or polygonal, especially quadratic or hexagonal. In addition, also pyramidal forms, especially having a high number of surfaces, for example an octagonal base area, may be used. The embossing pattern can also include elongated elevated or depressed embossing elements, for example in the form of elliptical or rod-shaped embossing elements. Also embossing elements of different forms can be present in an embossing pattern to further increase the counterfeit security. The dimension of the embossing elements is preferably in the range from 50 µm to 500 µm, particularly preferably in the range from 260 µm to 300 µm, the pattern height is advantageously below 200 µm, preferably below 100 µm, particularly preferably in the range from 30 µm to 90 µm. If the substrate of the security element consists of a smooth carrier material, for example of a polymer, then the dimension of the embossing elements can advantageously also be in the range from 50 µm to 150 µm. In this case, the pattern height is typically below 75 µm, preferably below 50 µm.

In elongated embossing elements, the sizes mentioned refer to the dimension in the transverse direction. In the longitudinal direction, the elongated embossing elements can have a dimension of multiple millimeters or even multiple centimeters. A combination of spherical and elongated embossing elements lends the security element additional counterfeit protection since, commercially, although spherical microlens arrays and lenticular arrays having elongated cylinder lenses are each available separately, no combination of such designs is.

The embossing elements are preferably arranged in a square grating, rectangular grating, rhombus grating, hexagonal grating or parallelogram grating. Here, the line screen(s) $W_P$ of the grid result from the sum of the dimension of the embossing elements $d_P$ and the distance $a_P$ between adjacent embossing elements. As mentioned, the dimension $d_P$ is advantageously between 200 µm and 500 µm, the line screen $W_P$ for each grating direction is preferably between $1.0*d_P$ and $1.2*d_P$ and the distance $a_P$ is advantageously less than 2 µm. Both the dimension $d_P$ and the distance $a_P$ and thus also the line screen $W_P$ can be constant or location dependent. Grids having the symmetry of a square, rectangular or hexagonal grating and having a constant line screen $W_P$, constant dimensions $d_P$ and constant distances $a_P$ are particularly preferred. A location-dependent line screen can especially be created by a side-by-side arrangement of sub-grids having line screens that are different but constant within a sub-grid. For example, sub-grids composed of spherical embossing elements can alternate with sub-grids composed of elongated embossing elements, which advantageously already have different line screens due to the different forms of the embossing elements. The sub-grids composed of elongated embossing elements can each especially also be only one-dimensional, that is, consist of n×1 elements arranged parallel to each other. In advantageous embodiments, the sub-grids composed of elongated embossing elements can also be developed in the form of a pattern, characters or a code.

To further increase the counterfeit security, the embossing pattern can include both elevated and depressed embossing elements, the elevated and depressed embossing elements being arranged in the form of a pattern, characters or a code. Due to the opposing optical effect of elevated and depressed embossing elements, the form formed by the embossing elements will be perceptible at least from certain viewing directions and constitutes a further piece of information within the security element.

Further, it can be provided that the embossing pattern comprises, besides the mentioned two-dimensional grid of embossing elements, at least one sub-region having embossing elements that are offset against the two-dimensional grid. The at least one sub-region mentioned is advantageously developed in the form of a pattern, characters or a code. Due to the offset, the sub-region of the offset embossing elements displays an appearance that differs from its surroundings such that the form of said sub-region constitutes a further, visually perceptible piece of information. The offset embossing elements can have the same form as the non-offset embossing elements, but can also have a differing form to increase contrast. Alternatively or additionally, the offset embossing elements can also have a dimension or line screen that differs from the dimension $d_P$ or line screen $W_P$ of the non-offset embossing elements.

In a further advantageous embodiment, the two-dimensional grid of embossing elements is developed as a regular two-dimensional grid, especially as a regular two-dimensional grid of elevated or depressed embossing elements.

The line grid of the coating advantageously includes a plurality of non-intersecting and preferably almost but not completely parallel lines. More precisely, the lines advantageously have a largely but, along the length dimension of the lines, not completely constant distance. Since the lines are not completely parallel, the line grid has no exact line screen, but an average line screen $W_L$ of the line grid can be specified in that the distance between adjacent lines is averaged over the length dimension of the lines and the lines present in the line grid. The specification that the lines have a largely constant distance then means that the distance between two adjacent lines along more than 90% of the length dimension of the two lines differs by less than 20%, preferably less than 10% from the average distance between the two lines.

The line grid and the embossing element grid are preferably coordinated with each other in such a way that, in a direction perpendicular or at 60° to the line grid, the line screen $W_P$ of the embossing element grid is substantially equal to the average line screen $W_L$. In this way, it can be ensured that the line segments of the lines in the line grid each come to lie substantially completely on the embossing elements of the embossing element grid.

The position of a line segment on an embossing element is advantageously given in each case by a phase function $\phi(x,y)$ that depends on the position (x,y) of the embossing element in the optically variable pattern and whose function value specifies the relative position of the line segment on the embossing element perpendicular to the length dimension of the line segment, normalized to the unit interval [0,1]. Here, the phase function $\phi(x,y)$ varies location dependently in such a way that a movement effect, especially a pump or rotation effect, is created when the security element is tilted.

In one advantageous embodiment, the phase function $\phi(x,y)$ depends directly, especially linearly, on the angle between the position (x,y) of the embossing element and a fixed reference point $(x_0, y_0)$ in the optically variable pattern such that a rotation effect about the reference point $(x_0, y_0)$ is created when the security element is tilted. In this case, the phase function is preferably given by $$\phi(x,y)=\mathrm{mod}((\alpha+k*\arg((x-x_0)+i(y-y_0))/(2\pi),1)$$

with an integer k≠0 and an offset angle α, where mod(x,y) represents the modulo function and arg(z) the argument of a complex number. The line grid then produces, when viewed, the visual impression of a windmill pattern having |k| blades that rotates when tilted about the reference point, the sign of k describing the rotation direction of the blades when tilted.

As mentioned, the present invention is not limited to designs having a single line grid, rather, the coating can advantageously also comprise two or more line grids, the parameters 'position of the line segment on the embossing element', 'orientation of the line segment on the embossing element' and 'form of the line segment' varying independently of each other for the line segments of each line grid.

Here, the line grids can produce different movement effects or identical movement effects in identical or different, especially opposing, directions. Advantageously, the lines of different line grids are applied with different colors to visually set the movement effects of the two line grids apart from each other. In principle, however, also the lines in a line grid can already have locally different colors to produce differently colored regions.

If a preferred direction defined by the line direction is allocated to every line grid, then the preferred directions of two or more line grids together advantageously include an angle of about 60° or about 90°.

For an arrangement of non-elongated, for example substantially spherical, embossing elements having a round base surface and an aspherical height profile, it is possible to represent the phase function used as the sum of two phase functions, $$\varphi(x,y)=\varphi_A(x,y)+\varphi_B(x,y),$$

where $\varphi_A(x,y)$ describes a movement effect when tilting in the north-south direction (tilt about the x-axis) and $\varphi_B(x,y)$ describes a movement effect when tilting in the east-west direction (tilt about the y-axis). Here, the individual phase functions $\varphi_A(x,y)$ and $\varphi_B(x,y)$ themselves can be composed of two or more phase functions that describe the same movement effect with different colors and a constant offset to each other. For example, with the colors red and blue, there can be $$\varphi_A(x,y)=\varphi_{A,red}(x,y)+\varphi_{A,blue}(x,y)$$

where $\varphi_{A,\,red}(x,y)=C+\varphi_{B,\,blue}(x,y)$ and C is a constant, for example 0.5.

The coating of a security element can comprise multiple sub-regions in which the line grids each produce different movement effects. Here, the sub-regions can especially be arranged in the form of patterns, characters or a code such that, due to the movement effects that are different in some regions, an additional piece of information is created. For example, a sub-region can be developed in the form of a value number and display a tilt effect, while the surrounding sub-region displays a rotation effect. Such principally different movement effects in immediate proximity are very conspicuous and thus, for the user, easy to memorize and easy to check.

In one development, the security element can comprise, in the form of patterns, characters or a code, a sub-region that remains static when the security element is tilted.

In one advantageous embodiment, the line grid(s) in the sub-region are omitted such that, in the sub-region, no line segments are present on the embossing elements. When the security element is tilted, independently of the viewing direction, the optically variable pattern appears in the sub-region to be, for example, highly reflective, especially glossy silver, or having the color of the contrasting background layer, and in this way forms a static piece of information.

According to one variant, the lines in the sub-region can be developed without a location-dependent variation and run exactly parallel to each other at a certain distance. In the sub-region, when the security element is tilted, the line grid is then visible only from a certain viewing direction, whereas from the remaining viewing directions, the optically variable pattern in the sub-region appears, for example, to be highly reflective or having the color of the contrasting background layer and thus forms a piece of information that remains virtually static.

In an alternative embodiment, in a coating that comprises two or more line grids applied with different colors, in the sub-region, only line segments of one color can be present on the embossing elements, while the lines in the line grids applied in other colors are omitted in the sub-region. Accordingly, when the security element is tilted, the sub-region appears only in the color of the non-omitted line grid, while the visual impression of the remaining security element varies depending on the viewing direction.

According to one variant, in the sub-region in which no line segments or only line segments of one color are present on the embossing elements, an ink can additionally be applied contiguously to, for example, further amplify the static effect.

In a further advantageous embodiment, the line segments in the sub-region can be overprinted with a strongly opaque ink.

Alternatively, in a further embodiment, the embossing grid can be omitted in the sub-region such that no embossing elements are allocated to the line segments of the line grid in the sub-region. When the security element is tilted, due to the lack of spatial depth and the resulting lack of dependence on the viewing direction, the visual impression of the sub-region does not change.

As already mentioned above, the optically variable pattern can further comprise an additional piece of information that is created by a variation of the embossing pattern in some regions. In this way, the additional piece of information can be created, for example, by a variation of the arrangement of non-line-shaped embossing elements, such as an offset in some regions or a change in the line screen in some regions. Such variations lead, for example, to a color change in some regions. Also a variation of the geometric form of non-line-shaped embossing elements in some regions, especially by providing a partial section of the geometry of the respective non-line-shaped embossing elements in such a way that said partial section is missing from the respective geometric form of the non-line-shaped embossing elements, is conceivable.

An additional piece of information can further be created by, in the embossing tool, a (macroscopic) additional piece of information that, in addition to (and superimposed on) the embossing pattern, effects, in a sub-region, an elevation or depression in some regions, especially in the form of patterns, characters or a code.

The line widths of the printed line grids are advantageously less than 0.5 times the line screen $W_P$ of the embossing element grid. They are preferably in the range from 25 µm to 300 µm, preferably in the range from 25 µm to 250 µm and particularly preferably in the range from 25 µm to 150 µm. The lines can have a constant line width or the line width can change along the length dimension of the lines, especially expand, shrink or be modulated on one or two sides. Here, the lines of the printed line grid can be depicted both as positive (printed) and as negative (omitted in the print image) lines. The specified line widths refer, in the case of positive lines, to the widths of the regions actually printed or covered with ink or, in the case of negative lines, to the widths of omitted line-shaped spaces without ink.

The line grids can especially be applied in the offset, nyloprint, flexo or screen printing method, both oxidatively and UV-drying inks being usable.

In one advantageous embodiment, the ink of the imprinted line grid or, in the event that two or more line grids applied with different inks are provided, at least the ink of one of the line grids has luminescent, especially fluorescent properties.

In embodiments in which the contrasting background layer is omitted in large areas, the ink of the imprinted line grid or, in the event that two or more line grids applied with different inks are provided, at least the ink of one of the line grids can be composed of an ink mixture that includes at least one laser-absorbing mixture component. Through impingement with a laser, such an ink can be selectively changed in the gap. The basic principle of such a method is explained in document DE 10 2013 000 152, the disclosure of which is incorporated in the present description by reference.

The embossing pattern is advantageously provided with a transparent cover layer that levels the embossing elements and in this way prevents especially a casting of the optically variable pattern.

As the substrate of the security element, especially carrier materials composed of cotton fibers, composed of polymers or a substrate having a hybrid structure may be used. Here, the security element can be part of a data carrier that provides the substrate such that the substrate of the security element constitutes a part of the substrate of the data carrier. The security element can also be applied, with its substrate, to a data carrier, or introduced into a data carrier such that the security element and the data carrier each comprise an independent, separate substrate.

The present invention also includes a data carrier having a security element of the kind described, the security element, in advantageous embodiments, being arranged in or over a window region or a through opening in the data carrier. Such an arrangement is advantageous especially in two-sided designs in which one of the movement effects is visible in direct top view, the other when viewed through the window region or the through opening. The data carrier can especially be a value document, such as a banknote, especially a paper banknote, a polymer banknote or a foil composite banknote, a stock, a bond, a certificate, a voucher, a check, a valuable admission ticket, but also an identification card, such as a credit card, a bank card, a cash card, an authorization card, a personal identity card or a passport personalization page.

In one advantageous embodiment, the data carrier comprises a foil element that is secured by the security element in that the security element extends over at least one sub-region of the foil element and at least one data carrier region adjoining the foil element. Any manipulation or even removal of the foil element then immediately attracts attention due to the overlapping security element. The foil element can especially be formed by a security strip, a security thread or a patch.

The present invention further includes a method for manufacturing an optically variable security element of the kind described above, in which
  a substrate having opposing first and second main surfaces is provided,
  a coating of the first main surface is produced in that at least one line grid and one background layer that contrasts with the line grid are applied to the substrate, and
  in an embossing step, an embossing pattern is produced on the first main surface in that a two-dimensional grid of elevated and/or depressed embossing elements is developed on the first main surface,
  the coating and the embossing pattern being combined in such a way that substantially on every embossing element lies at least one line segment of a line in the line grid, and at least one of the parameters 'position of the line segment on the embossing element', 'orientation of the line segment on the embossing element' and 'form of the line segment' varying location dependently across the dimension of the optically variable pattern such that, due to the line grid, a movement effect, especially a pump or rotation effect, is created when the security element is tilted.

In one method variant, the contrasting background layer is preferably applied contiguously to the first main surface, and the line grid(s) are imprinted on the contrasting background layer. To produce a static piece of information, the line grid can, together with the contrasting background layer, be removed in a sub-region in the form of patterns, characters or a code, especially by means of laser ablation, such that the visual impression in the sub-region undergoes no change when the security element is tilted.

In an alternative method variant, the line grid or grids can be imprinted on the first main surface, the contrasting background layer preferably applied contiguously over the line grids and, subsequently, the line grids exposed by removal of the background layer in some regions, for example by means of laser ablation. To additionally produce a static piece of information, the removal of the background layer in some regions can be absent in a sub-region such that the visual impression there when the security element is tilted continues to be dictated by the contrasting background layer.

The embossing pattern of the first main surface is advantageously produced by a blind embossing.

The preferred process sequence is then: applying the background layer, preferably in screen printing, imprinting the line grid, preferably in offset printing, and producing the embossing pattern, preferably in non-ink-receptive intaglio printing. Alternatively, the process sequence: applying the background layer, producing the embossing pattern and imprinting the line grid is also possible.

To produce the embossing patterns, the substrate can also be coated with a photo-curable lacquer, and the desired form of the embossing elements embossed in said lacquer and the embossed pattern coated with the background layer, for example by evaporation with metal or printing on with a suitable printing ink. The desired line grids are then applied, in a printing method, to the coated embossing elements produced in this way. The curing of the lacquer layer preferably takes place by UV irradiation during the embossing process, especially from the side of the substrate opposite the embossing tool, and/or through a transparent embossing tool.

In one advantageous development of the method, it is provided that
  a second coating is produced on the second main surface in that at least one second line grid is applied to the second main surface of the substrate,
  in the embossing step, together with the embossing pattern on the first main surface, simultaneously, a congruent embossing pattern having the inverse geometry is developed on the second main surface,
  the second coating and the second embossing pattern being combined in such a way that substantially on every embossing element lies at least one line segment of a line in the line grid of the second coating, and for the line grid of the second coating, at least one of the parameters 'position of the line segment on the embossing element', 'orientation of the line segment on the embossing element' and 'form of the line segment' varies location dependently across the dimension of the optically variable pattern such that, due to the line grid of the second coating, a movement effect, especially a pump or rotation effect, is created when the security element is tilted.

The at least one line grid of the first coating and the at least one line grid of the second coating are advantageously applied to the first and second main surface, respectively, in a simultaneous process.

The security element can be applied to, especially imprinted on, all types of substrates, especially a cotton substrate, polymer substrate or hybrid substrate. Here, through the printing methods mentioned (for instance screen, offset, flexo and intaglio printing), the components of the security element can be imprinted especially directly on the desired target substrate without a thread or patch being required. Following the embossing of the embossing pattern, the reverse-side region of the substrate potentially deformed thereby can, provided that it is not used according to the present invention, be filled with lacquer for stabilization.

The security element described can produce fluid movement effects that, depending on the design, can appear when tilted in all spatial directions. Despite the visually impressive effects, the security element is easily and economically manufacturable since only printing methods that are common in the security field need be used. The security element can be applied to practically all types of substrates and requires no special carrier. Due to a leveling of the embossing pattern, a casting can be effectively prevented and, in this way, a high counterfeit security achieved. Further, due to the simple manufacturing method, the security element can also be combined well with other intaglio printing features on a data carrier and registered therewith.

In a further aspect, the present invention includes, for protecting valuable articles, an optically variable security element having an optically variable pattern that comprises an embossing pattern and a coating, the coating comprising a highly reflective background layer and at least one imprinted line grid,
the embossing pattern comprising a regular two-dimensional grid of elevated or depressed embossing elements,
the coating and the embossing pattern are combined in such a way that substantially on every embossing element lies at least one line segment of a line in the line grid, and
at least one of the parameters 'position of the line segment on the embossing element', 'orientation of the line segment on the embossing element' and 'form of the line segment' varying location dependently across the dimension of the optically variable pattern such that a movement effect, especially a pump or rotation effect, is created when the security element is tilted.

In an associated method for manufacturing an optically variable security element, it is provided that a substrate having opposing first and second main surfaces is provided,
a coating of the first main surface is produced in that a highly reflective background layer and at least one line grid are applied to the substrate, and
an embossing pattern is produced on the first main surface in that a regular two-dimensional grid of elevated or of depressed embossing elements is developed on the first main surface,
the coating and the embossing pattern being combined in such a way that substantially on every embossing element lies at least one line segment of a line in the line grid, and at least one of the parameters 'position of the line segment on the embossing element', 'orientation of the line segment on the embossing element' and 'form of the line segment' varying location dependently across the dimension of the optically variable pattern such that a movement effect, especially a pump or rotation effect, is created when the security element is tilted.

Further, in a generic security element, it can be provided that the coating comprises at least one imprinted line grid and one background layer that contrasts with the line grid,
the embossing pattern comprises a one-dimensional grid of elongated elevated and/or depressed embossing elements,
the coating and the embossing pattern are combined in such a way that substantially on every elongated embossing element lies at least one line segment of one line in the line grid, and
at least one of the parameters 'local position of the line on the embossing element', 'orientation of the line on the embossing element' and 'form of the line' varies location dependently across the dimension of the optically variable pattern such that, due to the line grid, a movement effect, especially a pump or rotation effect, is created when the security element is tilted.

The above statements on the possible embodiments of the coating, the line grid, the background layer and the substrate apply equally for the embodiments having an embossing pattern having a one-dimensional grid. Here, care must merely be taken that, unlike in the embodiments having a two-dimensional grid, in the one-dimensional embossing element grids, not the position, orientation and form of a line segment varies, but rather the local position, the orientation and form of the line over the dimension of the optically variable pattern.

The local position of a line on an embossing element is advantageously given in each case by a phase function $\phi(x,y)$, with all phase functions described in greater detail in connection with two-dimensional embossing element grids being able to be used. Here, too, care must merely be taken that the phase function in this case does not describe the relative position of a line segment on the embossing element, but rather the local position of the line on the embossing element.

Accordingly, the position of a line segment on an embossing element is given by a phase function $\phi(x,y)$ that depends on the position $(x,y)$ of the embossing element in the optically variable pattern and whose function value specifies the local position of the line on the embossing element, normalized to the unit interval [0,1]. Here, the phase function $\phi(x,y)$ varies location dependently in such a way that a movement effect, especially a pump or rotation effect, is created when the security element is tilted.

The embodiments having a one-dimensional grid produce a movement effect substantially only when tilted about an axis that lies parallel to the elongated embossing elements, while for a tilt about an axis that lies perpendicular to the elongated embossing elements, substantially no movement effect is produced. If the elongated embossing elements lie, for example, with their longitudinal direction parallel to the x-axis and their transverse direction parallel to the y-axis, then a movement effect occurs only upon tilting in the north-south direction (about the x-axis), but not upon tilting in the east-west direction (about the y-axis). With the terminology introduced above, the phase functions used thus have only the portion for the movement effect upon tilting in the north-south direction $$\varphi(x,y)=\varphi_A(x,y).$$

It is understood that, here, too, the phase function $\varphi_A(x,y)$ can be composed of two or more phase functions that describe the same movement effect with different colors and a constant offset to each other, so for example for the colors red and blue:

$$\varphi_A(x,y)=\varphi_{A,red}(x,y)+\varphi_{A,blue}(x,y),$$

with $\varphi_{A,\ red}(x,y)=C+\varphi_{A,\ blue}(x,y)$ and a constant C.

Here, it is advantageously provided that the lines are arranged substantially parallel to the longitudinal direction of the elongated embossing elements.

The present invention also includes an associated method for manufacturing an optically variable security element in which it is provided that a substrate having opposing first and second main surfaces is provided, a coating of the first main surface is produced in that at least one line grid and one background layer that contrasts with the line grid are applied to the substrate, and in an embossing step, an embossing pattern is produced on the first main surface in that a one-dimensional grid of elongated elevated and/or depressed embossing elements is developed on the first main surface, the coating and the embossing pattern being combined in such a way that substantially on every elongated embossing element lies at least one line in the line grid, and at least one of the parameters 'local position of the line on the embossing element', 'orientation of the line on the embossing element' and 'form of the line' varying location dependently across the dimension of the optically variable pattern such that, due to the line grid, a movement effect, especially a pump or rotation effect, is created when the security element is tilted.

For further details on the manufacturing method, reference is made to the above statements on the two-dimensional designs, which, except for the dimensionality of the grid, also apply to the one-dimensional designs.

Further exemplary embodiments and advantages of the present invention are explained below by reference to the drawings, in which a depiction to scale and proportion was dispensed with in order to improve their clarity.

BRIEF DESCRIPTION OF THE DRAWINGS

Shown are.

DETAILED DESCRIPTION OF VARIOUS EMBODIMENTS

Figure 1:
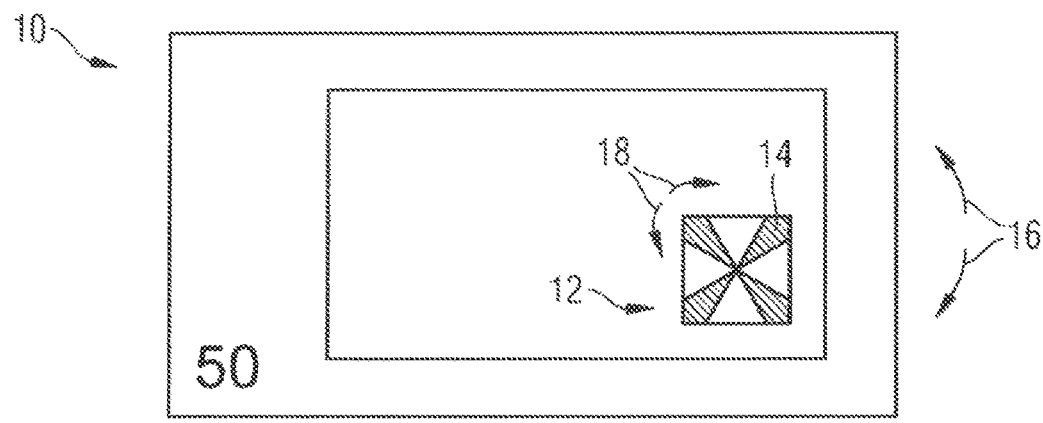
FIG. 1 a schematic diagram of a banknote having an optically variable security element according to the present invention, FIGS. 2a-b in (a), a top view of a section of the security element in FIG. 1, and in (b), a cross section through the security element along the line B-B in (a), FIGS. 3a-d to explain the inventive principle, in (a), an individual elevated embossing element, and in (b) to (d), various positions of a line segment on the embossing element, in top view, FIG. 4 in a two-dimensional projection, a section on the line grid of the security element in FIG. 1, FIG. 5 a view as in FIG. 4 for a line grid of another security element according to the present invention, FIGS. 6a-b in (a), the appearance of a security element having two line grids when viewed perpendicularly, and in (b), a detailed section of the security element in (a), FIG. 7 a further exemplary embodiment of a security element having different-colored line grids, FIG. 8 an exemplary embodiment of a security element having multiple line grids that are substantially perpendicular to each other, FIG. 9 a further exemplary embodiment of a security element having multiple line grids that are substantially perpendicular to each other, FIG. 10 a modification of the security element in FIG. 4 in which the movement effect described there is combined with a static effect, FIG. 11 a cross section through a security element according to the present invention having optically variable patterns on opposing main surfaces of the substrate of the security element, FIG. 12 a security element according to the present invention having a two-sided design, but only one optically variable pattern on the first main surface of the substrate, FIG. 13 an exemplary embodiment of a security element having an additional line-shaped see-through piece of information, FIG. 14 a further exemplary embodiment of a security element having a background layer that is developed to be pattern shaped, FIG. 15 a two-sided security element that is provided in an opaque region of a data carrier, FIG. 16 a modification of the security element in FIG. 15 in which the background layers are not formed by reflective layers, FIG. 17 the embossing pattern of a security element according to the present invention that includes both elevated and depressed embossing elements that are arranged in the form of the numeric string "50", FIG. 18 a top view of a section of a security element whose embossing pattern includes a sub-region having elongated embossing elements, FIG. 19 a security element according to the present invention whose embossing pattern comprises a sub-region having embossing elements offset against the grid, FIG. 20 a banknote having a foil element secured by a security element according to the present invention, FIG. 21 a security element according to the present invention having multiple sub-regions in which the line grid produces different movement effects, and FIG. 22 in two-dimensional projection, a section on the line grid of a security element having a one-dimensional grid of elongated embossing elements.

The invention will now be explained using the example of security elements for banknotes. For this, FIG. 1 shows a schematic diagram of a banknote 10 having an optically variable security element 12 according to the present invention. The security element 12 has a glossy metallic appearance having an additional colored, windmill-like blade pattern 14. Here, even a small tilting 16 of the banknote upward or downward produces a visually very conspicuous apparent rotation movement 18 of the colored blades 14.

Figure 2A:
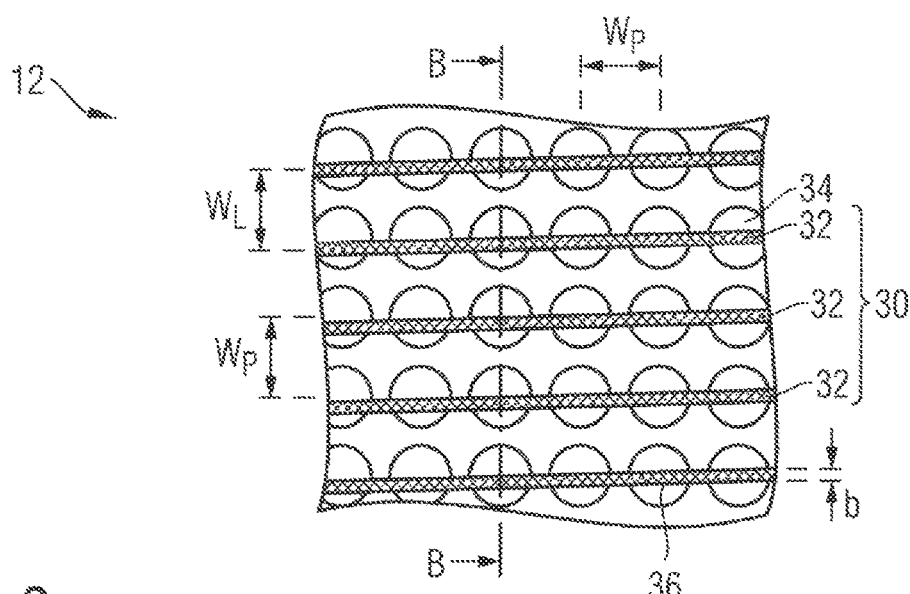
Figure 2B:
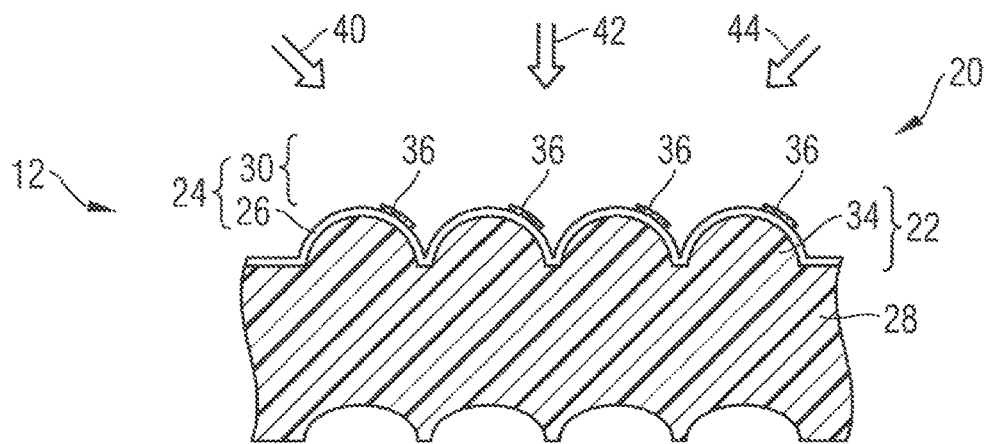

The structure of a security element according to the present invention and the occurrence of the conspicuous colored rotation effect will now be explained in greater detail with reference to FIGS. 2 and 3, FIG. 2(a) showing a top view of a section of the security element 12, and FIG. 2(b), a cross section through the security element along the line B-B in FIG. 2(a). To explain the inventive principle, further depicted in FIG. 3(a) is a single elevated embossing element 34, and FIG. 3(b) to (d) show various positions of a line segment 36 on the embossing element 34, in top view.

The security element 12 includes an optically variable pattern 20 that is formed by a combination of an embossing pattern 22 and a coating 24. The coating 24 comprises a highly reflective background layer 26, for example a contiguous reflecting silver-colored printing layer having a high gloss value and that is imprinted in screen printing on the banknote substrate 28 of the banknote 10. The banknote substrate 28 simultaneously constitutes, in the sub-region in which the optically variable pattern 20 is present, the substrate of the security element 12, such that the security element 12 is integrated into the banknote 10. The silver background layer 26 lends the security element 12 its principally glossy metallic appearance.

On the background layer 26 is imprinted a colored, for example gold-colored, line grid 30 composed of a plurality of substantially identically oriented lines 32. The lines 32 do not intersect each other and have a largely but, along the length dimension of the lines, not completely constant distance and are thus also referred to within the scope of this description as nearly parallel. As described in greater detail below, the desired movement effects are created precisely by the deviation of the line grids according to the present invention from line grids having completely parallel lines.

In the exemplary embodiment, the line width b of the lines 32 is identical for all lines 32 and constant along the length dimension of the lines. The line width b is advantageously between 50 µm and 200 µm, and in the exemplary embodiment specifically about 80 µm. Since the lines 32 are not completely parallel, only an average line screen $W_L$ of the line grid can be specified, which in the exemplary embodiment is $W_L$=300 µm.

Figure 3A:
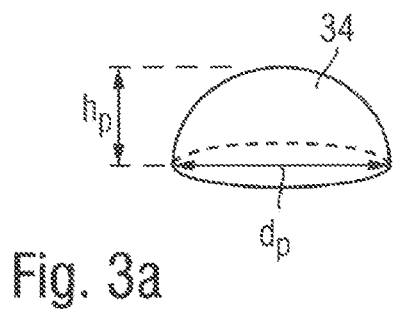

The coating 24 formed by the background layer 26 and the line grid 30 is combined with an embossing pattern 22 that consists of a two-dimensional quadratic grid of embossing elements 34 that, in the exemplary embodiment, are formed by compressed hemispherical elevations, as shown in FIG. 3(a) in perspective view. Here, the elevations 34 have, for example, a base diameter $d_P$ of 250 µm and a height $h_p$ of 75 µm. As can be seen in FIG. 2, the line screen $W_P$ of the embossing element grid is somewhat larger than the base diameter $d_P$ and, in the exemplary embodiment, is 1.2*$d_P$, such that the line screen $W_P$ of the embossing element grid is likewise 300 µm and thus matches with the average line screen $W_L$ of the line grid.

As shown in FIG. 2, the coating 24 and the embossing pattern 22 are, through the matched values of the line screens $W_P$ and $W_L$, combined with each other in such a way that, on the one hand, every elevation 34, due to the silver background layer 26, acts as a small convex mirror, and in that, on the other hand, substantially on every elevation 34 lies a line segment 36 of a line 32 from the line grid 30. As becomes clear from the following description, principally every elevation 34 should bear a line segment 36, however, due to the specific progression of the lines 32, there can also be some elevations 34 in the embossing pattern on which no line segment 36 comes to lie, or a certain sub-region of the embossing pattern is selectively not covered with line segments in order to produce a static sub-pattern within the dynamic movement effect of the optically variable pattern.

The relative arrangement of a line segment 36 and of the associated embossing element 34 on which said line segment 36 lies is specified by the position of the line segment 36 on the embossing element 34 and by the orientation of the line segment 36 on the embossing element 34. If, additionally, the form of the line segment 36, that is, especially the line width b and the color of the line segment 36 is specified, then the position and look of a certain line segment 36 are completely characterized.

Of particular importance within the scope of the present invention is the parameter 'position of the line segment on the embossing element'. Said line segment position can especially be specified by a location-dependent phase function $\varphi(x,y)$ that depends on the position (x,y) of the embossing element 34 within the optically variable pattern 20 and whose function value specifies the relative position of the line segment 36 on the embossing element perpendicular to the length dimension of the line segment 36, normalized to the unit interval [0, 1].

Figure 3B:
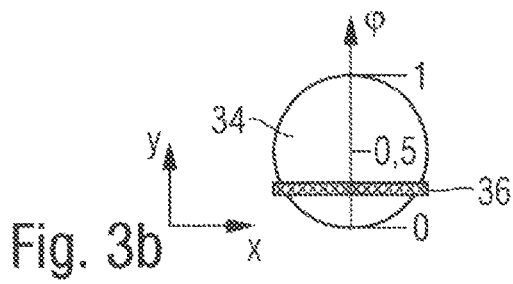
Figure 3C:
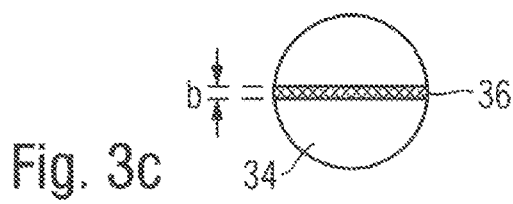
Figure 3D:
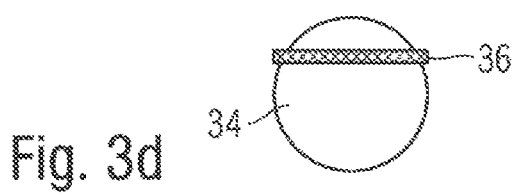

If, for example, as in FIG. 3(b), the lines 32 are aligned substantially parallel to the x-axis, then the phase function $\phi(x,y)$ specifies the y-position of the line segment 36 on the embossing element 34, where a value $\phi$=0 means a position at the bottom edge and a value $\phi$=1, a position at the top edge. In FIGS. 3(b) to (d), for illustration, in each case, the position of a line segment 36 is shown for the values $\phi$=0.25 (FIG. 3(b)), $\phi$=0.5 (FIG. 3(c)) and $\phi$=0.75 (FIG. 3(d)).

Figure 8:
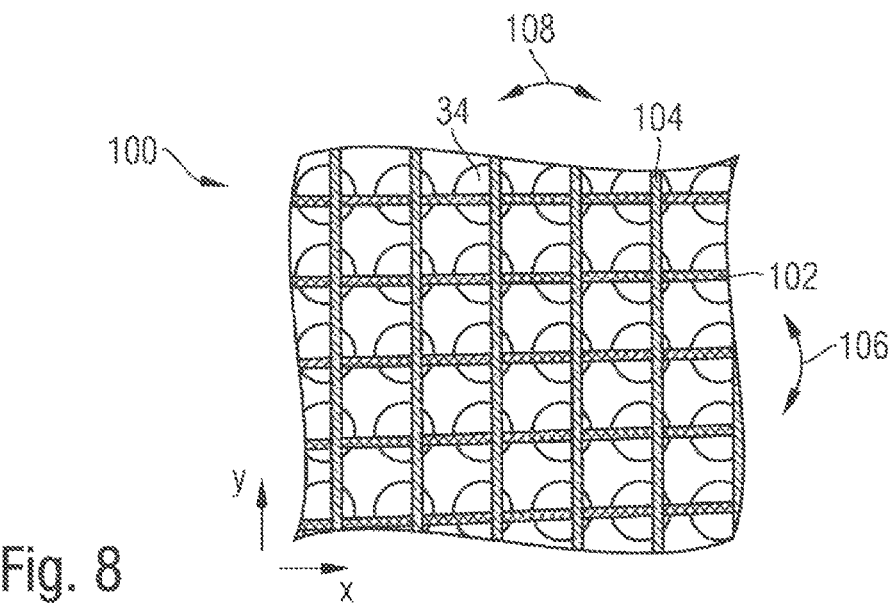
Figure 9:
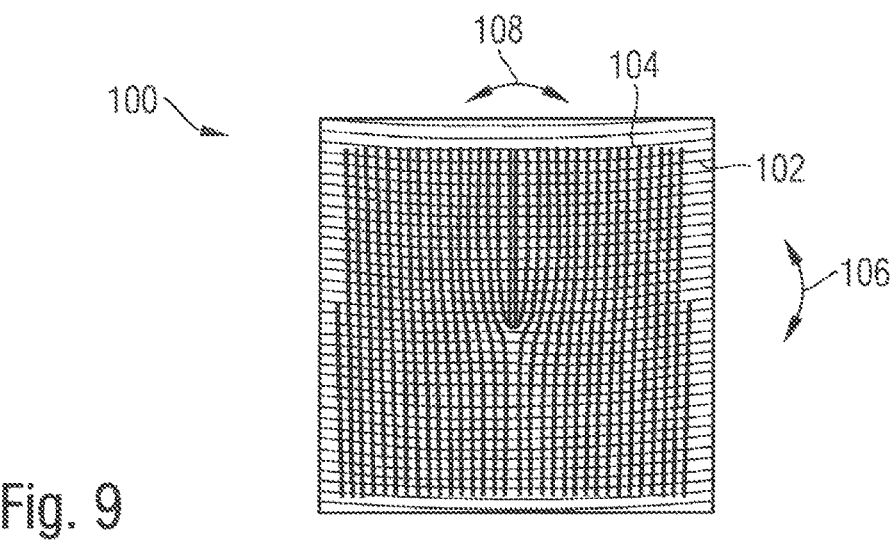

For lines 32, which are aligned substantially parallel to the y-axis as shown, for instance, in FIGS. 8 and 9, the phase function $\phi(x,y)$ accordingly specifies the x-position of a line segment on the embossing element, where a value $\phi$=0 then means a position at the left edge and a value $\phi$=1, a position at the right edge.

The present inventors have now surprisingly found that, through a location-dependent variation of the position of the line segments 36 on the embossing elements 34, it is possible to realize a plurality of different movement effects when the security element 12 is tilted. All of these different movement effects can be described by a corresponding location-dependent phase function $\phi(x,y)$.

As illustrated in FIG. 2(b), the line segments 36 arranged on the elevations 34 produce, depending on the viewing direction 40, 42, 44, a different color and brightness impression that additionally, for a location-dependent position of the line segments 36, also depends on the position of the respective elevation 34 within the optically variable pattern. The security element 12 thus already displays, when viewed from a fixed viewing direction 42, a predetermined image motif, such as the blade pattern 14 depicted in FIG. 1. If the security element 12 is tilted such that, for example, the viewing direction changes from the perpendicular direction 42 to an oblique direction 40, 44, then the color and brightness of the optically variable pattern change fluidly, but locally differently, such that the impression of a movement is created. Depending on the design of the line grid, linear movements, rotation movements or complex forms of movement, such as pump or "zoom" effects or opposing movements in some regions, can be produced.

Rotation effects have proven to be particularly impressive, since the production of a rotation movement through linear tilting of a security element runs counter to intuition and thus has a surprising effect for the viewer. Such rotation effects can be produced in that the parameter 'position of the line segment on the embossing element' depends directly, especially linearly, on the angle between the position (x,y) of the embossing element and a fixed reference point $(x_0, y_0)$ in the optically variable pattern.

To produce, in a quadratic grid of hemispherical elevations 34, the visual impression of four "windmill" blades that rotate about a reference point that lies in the middle of the optically variable pattern, for example the phase function $$\phi_1(x,y)=\mathrm{mod}(4*\arg(x+iy)/(2\pi),1)$$

can be chosen, where mod(x,y) represents the modulo function and arg(z) the argument of a complex number.

Figure 4:
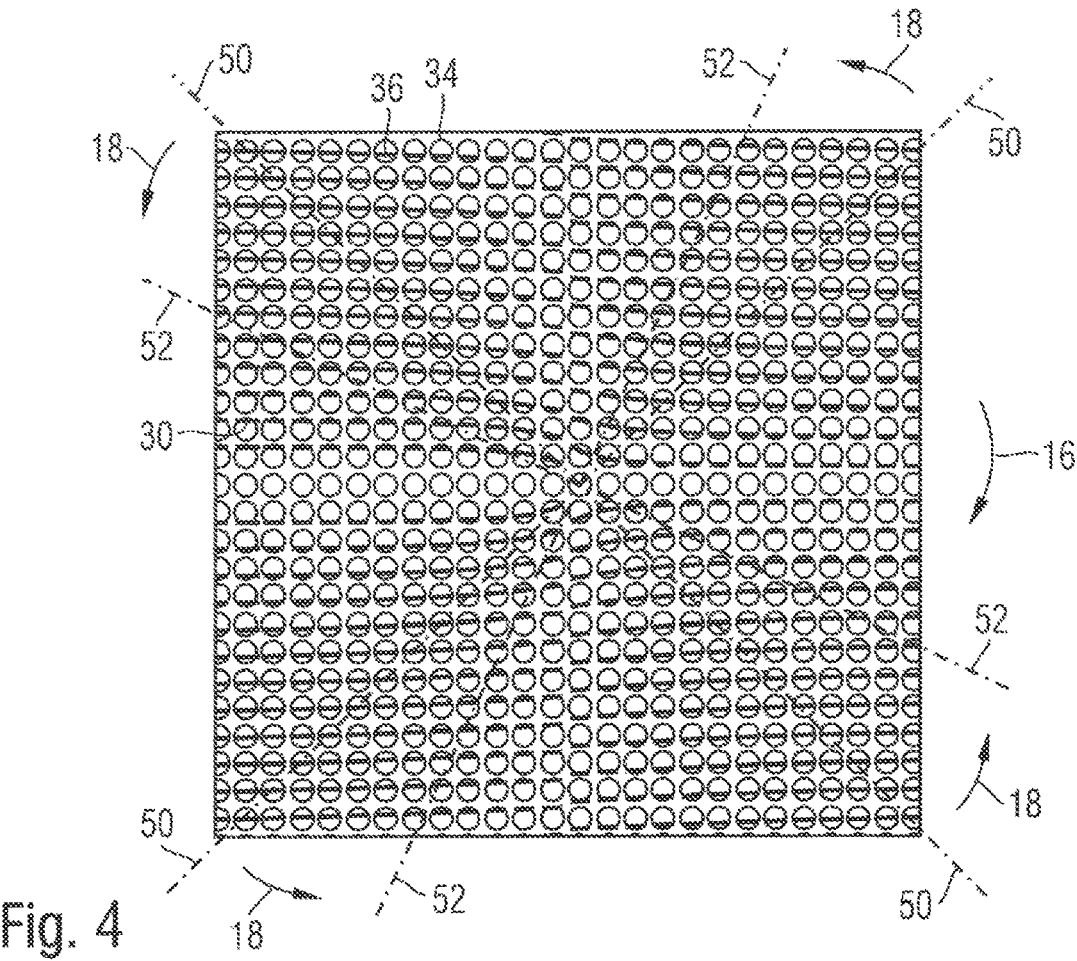

FIG. 4 shows, in two-dimensional projection, a section on the associated line grid 30 of the security element 12 having the line segments 36 arranged according to the phase function $\phi_1(x,y)$ and the embossing elements 34 indicated in contour. Due to the lack of spatial depth in the two-dimensional projection and, as a result of this, the lack of dependence of the visual impression on the viewing direction, the rotation effect described in the projection in FIG. 4 does not occur, it is created only in a truly three-dimensional, embossed security element 12.

When the security element 12 is viewed perpendicularly, the line segments 36 that lie in the middle ($\phi_1$=0.5) and thus at the highest point of the elevations 34 appear most markedly, while the line segments that lie on the top and bottom edges of the elevations 34 visually recede. As can be seen in FIG. 4, the line segments 36 that lie in the middle of the elevations 34 are arranged substantially along the two diagonals 50 such that, when viewed perpendicularly, the appearance shown in FIG. 1 having four blades 14 extending along the diagonals 50 is created.

If the security element 12 is now, for example, tilted downward (tilting 16), then, due to the tilting, from the viewer's perspective, the line segments 36 that previously lay at the highest point reach the bottom edges of the elevations 34 and thus visually recede. On the other hand, the line segments 36 that previously lay at the top edges are tilted to the highest point such that they now dominate the visual appearance. As shown in FIG. 4, the associated elevations 34 all lie substantially along the diagonals 52, which are rotated counterclockwise by an angle 18, such that, after the tilting 16, an appearance having four blades 14 that are rotated counterclockwise by an angle 18 results. Accordingly, a tilting of the security element 12 upward results in an apparent clockwise rotation of the blades 14.

As can be further seen in FIG. 4, small tiltings 16 result in a rotation by a small angle 18, larger tiltings, a rotation by a larger angle, such that the apparent rotation movement of the blades 14 proceeds fluidly upon tilting.

The described effects result immediately from the chosen phase function $\phi_1(x,y)$, since said function depends only on the angle between the position of the embossing element and the reference point, such that the positions of identical line segment positions each extend radially from the reference point outward (lines 50, 52 in FIG. 4). Through another choice of pre-factor in $\phi_1(x,y)$, also an arbitrary different number of blades or the opposite rotation direction can, of course, be produced. Also the appearance of the blades in the radial direction can change in that, for example, the line width b is varied with the distance from the reference point.

To manufacture the security element 12, first, for example, the contiguous, reflective silver-colored printing layer 26 is imprinted on the banknote substrate 28 of the banknote 10. Then the line grid 30 is imprinted on the silver layer 26 in offset printing, for example with an oxidatively or UV-drying ink, e.g. yellow. Subsequently, through blind embossing in non-ink-receptive intaglio printing, the embossing pattern 22 having the elevations 34 is produced on the top of the banknote 10. To stabilize the elevated pattern on the top, the reverse of the banknote substrate 28 deformed by the embossing can be filled with lacquer. The embossing pattern 22 is advantageously additionally provided with, not depicted in the figure, a transparent cover layer that levels the elevations 34 and, in this way, prevents a casting of the optically variable pattern.

What has likewise proven to be very impressive are pump effects when the security element 12 is tilted, in which, at different tilt angles, an enlarging or shrinking contour of a specified motif is visible ("zooming the motif in or out").

For a quadratic grid of hemispherical elevations 34 having a line screen $W_p$, a line grid 60 that produces the visual impression of pumping circular rings spaced 10 line screens apart can be obtained, for example, through the phase function $$\phi_2(x,y)=\mathrm{mod}(abs(x+iy)/10*W_P,1)$$

where abs(z) represents the absolute value of a complex number.

Figure 5:
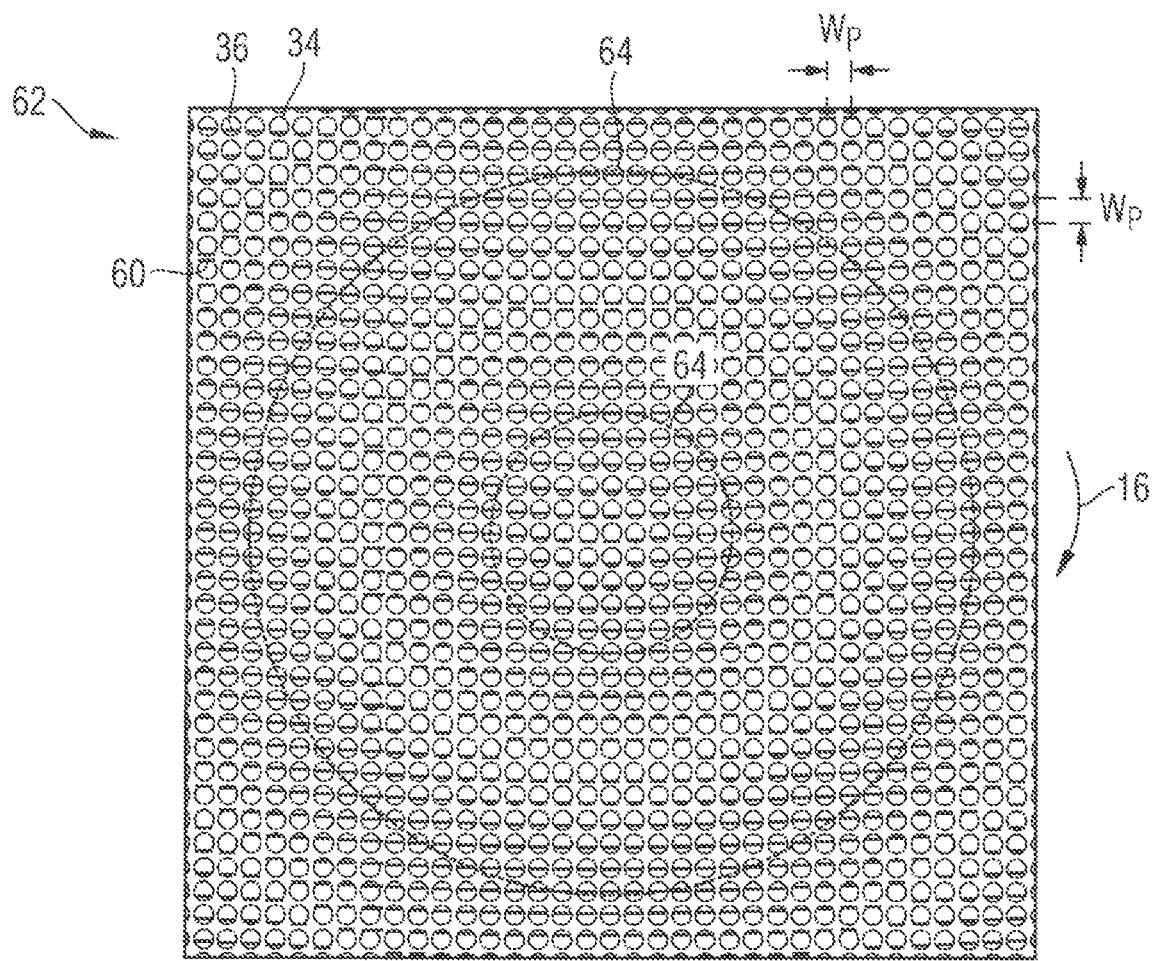

FIG. 5 shows, in two-dimensional projection, a section on the associated line grid 60 of the security element 62 with the line segments 36 and the embossing elements 34 indicated in contour.

When the security element 62 is viewed perpendicularly, the line segments 36 that lie in the middle ($\phi_2$=0.5) of the elevations 34 appear most markedly, while the line segments that lie on the top and bottom edges of the elevations 34 visually recede. As can be seen in FIG. 5, for the phase function $\phi_2$, the line segments 36 that lie in the middle of the elevations 34 are arranged substantially on concentric circles 64 having radii of $5*W_p$, $15*W_p$, $25*W_p$, etc. When viewed perpendicularly, the security element 62 thus displays a series of concentric circles having the diameters mentioned.

If the security element 12 is now tilted, for example, downward in the tilt direction 16, then the line segments 36 that initially lie at the highest point end up, from the viewer's perspective, at the bottom edges of the elevations 34 and thus visually recede, while the line segments 36 that previously lay at the top edges are tilted to the highest point and dominate the visual appearance. As can be seen in FIG. 5, the associated elevations 34 lie on somewhat large concentric circles, for example having radii $7*W_p$, $17*W_p$, etc., such that, due to the tilting 16, the concentric circles 64 appear to enlarge. Accordingly, by tilting the security element 62 in the opposite direction, an apparent shrinking of the concentric circles 64 results such that, by tilting the security element 62 back and forth, the desired pump effect is created.

It is understood that also the phase function $\phi_2$ in FIG. 5 is mentioned only by way of example and that, instead of circles, for example also squares, stars or other polygons, but also more complex objects such as symbols or value numerals and also other distances between the concentric figures can be produced.

The principle described is not limited to designs having a single line grid, rather, the coating of a security element can also include two or more line grids, the parameters 'position of the line segment on the embossing element', 'orientation of the line segment on the embossing element' and 'form of the line segment' being able to vary independently of each other for the line segments of each line grid. The line grids can thus especially also produce different movement effects or identical movement effects in different directions. Further, the lines in the line grids are advantageously applied with different colors to visually differentiate the movement effects of the line grids.

Figure 6A:
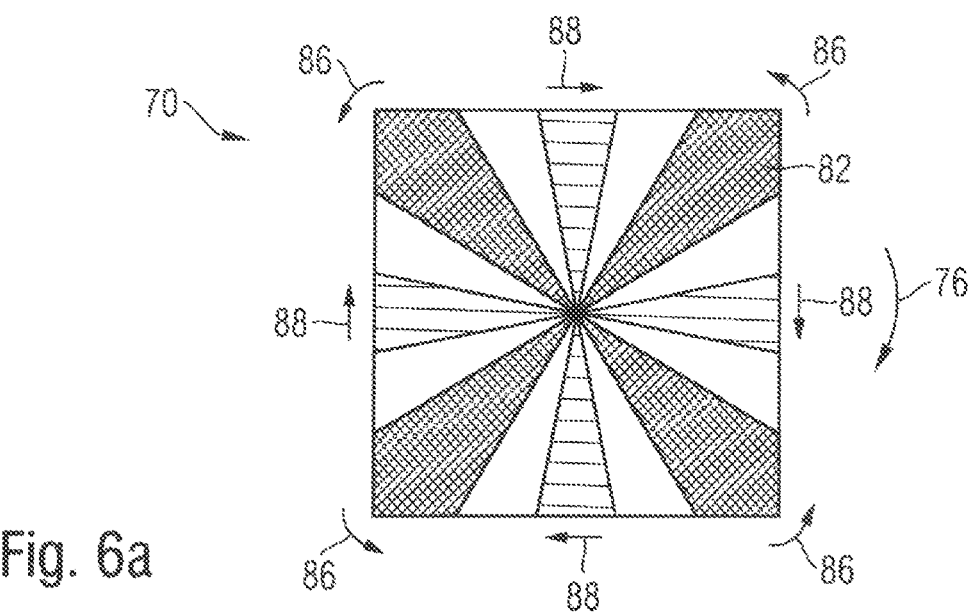
Figure 6B:
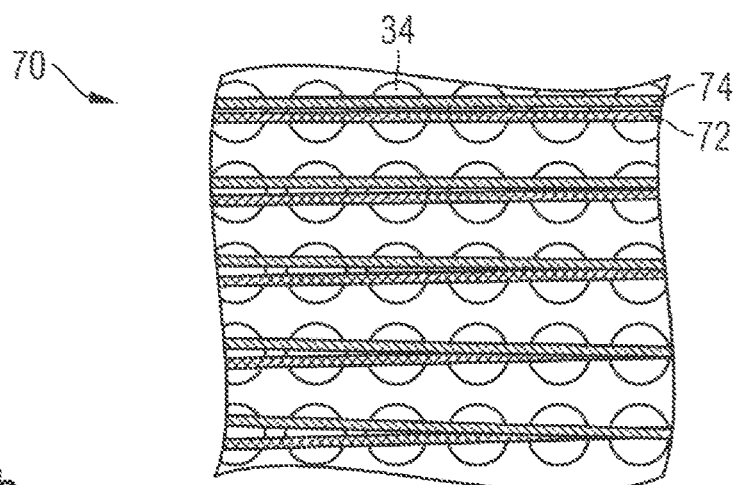

For illustration, FIG. 6(a) shows the appearance of a security element having two line grids when viewed perpendicularly, and FIG. 6(b), a detailed section of the security element 70.

In the security element 70, the embossing pattern 22 already described above is combined with a coating that, in addition to the highly reflective background layer 26, includes two line grids 72, 74. The first line grid 72 consists of red lines and is described by the phase function $$\phi_1(x,y)=\mod(4*\arg(x+iy)/(2\pi),1)$$

already explained in connection with FIG. 4. The second line grid 74 consists of blue lines that are described by a modified phase function $$\phi_3(x,y)=\mod(4*(\pi/4-\arg(x+iy))/(2\pi),1).$$

The red line grid 72 then produces, as explained above, in interplay with the embossing pattern 22, a red windmill pattern having four blades 82 that, when the security element 70 is tilted downward (reference sign 76) appear to rotate against the clockwise direction (rotation direction 86).

The phase function $\phi_3(x,y)$ is rotated 45° to the right compared with the phase function $\phi_1(x,y)$ and, in addition, its function values decrease as the angle increases. The blue line grid thus produces, in interplay with the embossing pattern 22, a blue windmill pattern having four blades 84 that, in the starting position, when viewed perpendicularly, are rotated by 45° against the blades 82 of the red windmill pattern, and that, when the security element 70 is tilted downward (reference sign 76), appear to rotate clockwise (rotation direction 88).

Such a security element 70 having two opposite colored rotation effects is very conspicuous for the viewer and thus has a high attention and recognition value.

Figure 7:
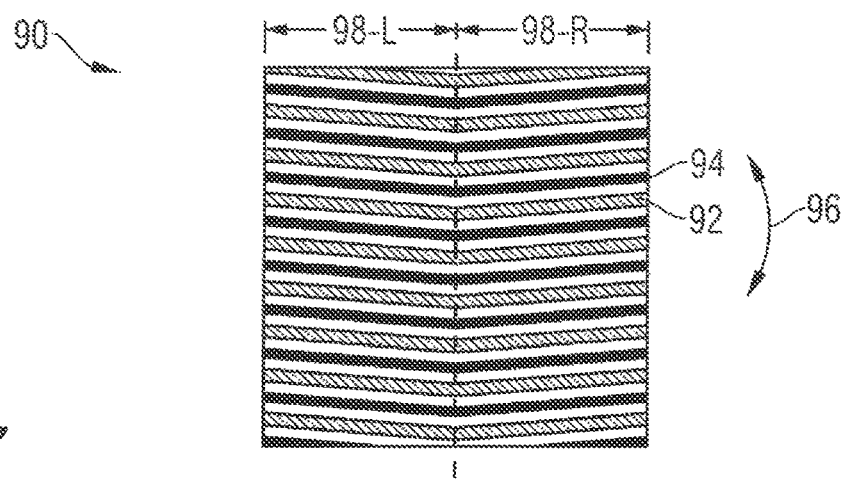

A further exemplary embodiment of a security element 90 having different-colored line grids 92, 94 is shown in FIG. 7, with only the line grids without the projected embossing elements being depicted for the sake of simpler illustration. The line grids 92, 94 are imprinted in screen printing with different inks, for example red and blue. The security element 90 provided with a highly reflective background layer 26 and the two line grids 92, 94 displays in alternation, when viewed perpendicularly, perpendicular red and blue strips that, when the security element is tilted in the tilt direction 96, appear to move to the right or left, that is, display an orthoparallactic movement behavior in which the movement direction is perpendicular to the tilt direction. Due to the opposite slope of the lines in the two sub-regions 98-L and 98-R, the apparent movement in the two sub-regions is mirror-inverted to each other such that, for example when the security element 90 is tilted downward, the perpendicular red and blue strips in the sub-region 98-L migrate to the left, and in the sub-region 98-R, to the right.

The multiple line grids 102, 104 of a security element 100 can, for example, in a quadratic embossing grid, also be perpendicular to each other, as illustrated in FIG. 8. There, the lines in the line grid 102 extend substantially along the x-axis and thus produce a movement effect when the security element 100 is tilted in the tilt direction 106, perpendicular to the x-axis. The lines in the line grid 104, in contrast, extend substantially along the y-axis and thus produce a movement effect when the security element 100 is tilted in the tilt direction 108, perpendicular to the y-axis.

FIG. 9 shows a concrete exemplary embodiment of such a security element 100, with only the two line grids 102, 104 without the projected embossing elements 34 being depicted, for the sake of simpler illustration. Here, the line grids 102, 104 are printed with different colors and produce, when tilted in the tilt direction 106 and in the tilt direction 108, different movement effects, for example a pump effect in the tilt direction 106 and a rotation effect in the tilt direction 108.

Depending on the symmetry of the embossing pattern grid, also other angular relationships between the line grids may be used. For example, in a hexagonal grating, three line grids can be provided that substantially include angles of 60° or 120° between them.

Figure 10:
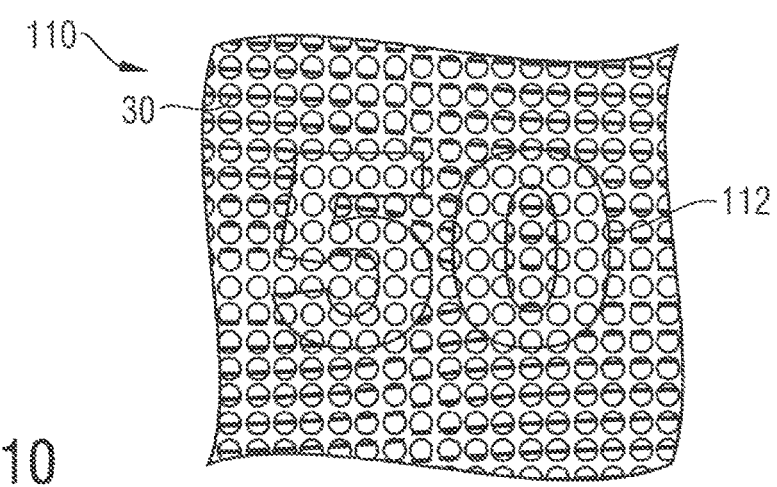

The movement effects described can also be combined with a static effect, that is, with a sub-region that does not participate in the apparent movement upon tilting, and thus constitutes a stabilizing influence in the moving surroundings. For illustration, FIG. 10 shows a security element 110 that, in principle, is developed like the security element in FIG. 4.

In the security element 110, however, the line grid 30 is omitted in a sub-region 112 that, in the exemplary embodiment, is developed in the form of the numeric string "50" such that, there, no line segments lie on the embossing elements 34. In the sub-region 112, the security element 110 thus displays, independently of the tilt position of the security element, an unchanged metallic appearance such that the security element 110 displays, in addition to the rotating windmill pattern 14, the stationary numeric string "50".

In a variant that is not shown, in the sub-region 112 in which no line segments are present on the embossing elements 34, additionally, for example to amplify the static effect, an ink, especially in a hue that differs from the hue of the line segment, can be applied.

Alternatively, a gap in the line grid 30 can be dispensed with and, instead, the line grid overprinted with a strongly opaque ink in the sub-region 112.

In a further embodiment that is not shown, alternatively, the embossing grid can be omitted in the sub-region 112 such that no embossing elements 34 are allocated to the line segments of the line grid in the sub-region. When the security element is tilted, due to the lack of spatial depth and the resulting lack of dependence on the viewing direction, the visual impression of the sub-region does not change and thus likewise constitutes a stabilizing effect in the moving surroundings.

In the exemplary embodiments described so far, the optically variable effect is visible substantially on only one side of the security element. Furthermore, however, the present invention also includes two-sided designs that, when viewed from opposing sides, each display an optically variable effect.

For this, in a first design variant, there are provided both on the front and on the reverse of a data carrier optically variable patterns that each comprise an embossing pattern and a coating. Here, the embossing pattern of the reverse is produced simultaneously in the same production step with the embossing pattern of the front and is thus developed to be congruent but inverse to the first embossing pattern on the front.

Figure 11:
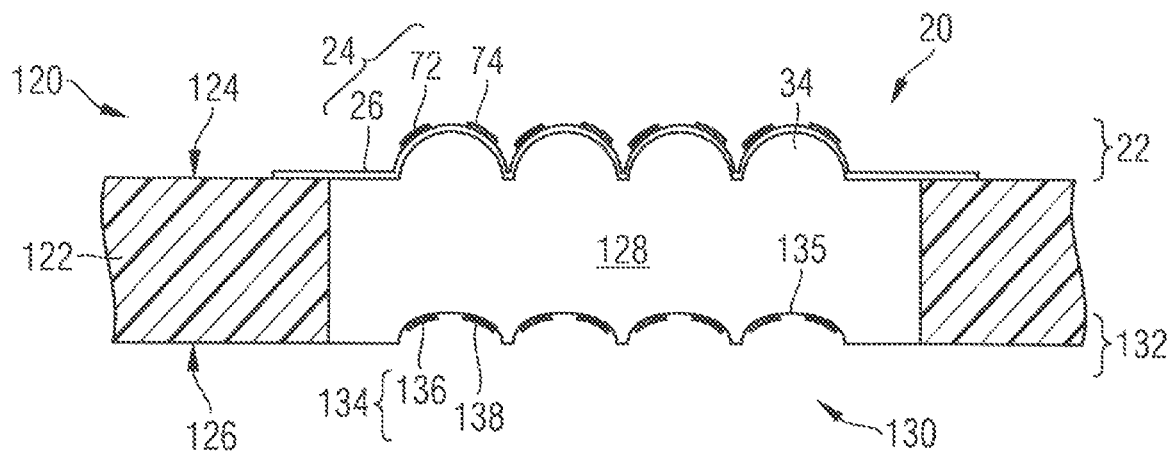

For a more detailed explanation, FIG. 11 shows a cross section of a polymer banknote 120 in whose substrate 122 a transparent window region 128 is developed. On the front 124 of the banknote is arranged a first optically variable pattern 20, of the kind already described in greater detail in connection with FIGS. 2 to 10, that is formed by a combination of an embossing pattern 22 and a coating 24. The coating 24 comprises, in addition to the highly reflective silver background layer 26, two line grids 72, 74, as described in greater detail in the exemplary embodiment in FIG. 6.

The first optically variable pattern 20 of the front 124 is combined with, arranged on the reverse 126 of the banknote, a second optically variable pattern 130 that comprises a second embossing pattern 132 and a second coating 134 that is likewise formed by two line grids 136, 138 of the kind described above.

Here, the second embossing pattern 132 was produced simultaneously with the first embossing pattern 22 in the same production step, in the exemplary embodiment for instance through a blind embossing step. Here, the front of the banknote is the side of the substrate 122 facing the embossing plate in the embossing step. In the exemplary embodiment in FIG. 11, in addition to the embossing patterns 22 on the front, also the deformations produced in the reverse due to production are used as embossing patterns 132. The embossing patterns 132 have a geometry that is inverse to the embossing patterns 22 in the front, that is, the elevations and depressions are arranged congruently and with an identical pattern repeat, but with the roles of the elevations and depressions switched. Due to the backpressure blanket used, the reverse-side embossing patterns 132 have an increased roughness compared with the front-side embossing patterns 22.

The positions of the line segments in the reverse-side line grids 136, 138 are given by a phase function $\phi_{RS}$ (x,y), for which the statements made above on the phase functions of the front-side line grid likewise apply. In particular, the coating 134 and the embossing pattern 132 are, due to the matched values of their line screens, combined with each other in such a way that substantially in every depression 135 lies a line segment of a line from the line grids 136, 138.

Due to the coating with the highly reflective silver background layer 26, when viewed from the reverse 126, the elevations 34 on the front 124 of the substrate 122 act as small concave mirrors. In the exemplary embodiment, the curvature of the elevations 34 is coordinated with the thickness of the substrate 122 in such a way that the focus of the small concave mirrors lies in the region of the lines in the line grids 136, 138.

The line grids 72, 74 in the front and the line grids 136, 138 in the reverse can, with their phase functions $\phi_{VS}$ (x,y) and $\phi_{RS}$ (x,y), produce identical or different movement effects.

The highly reflective background layer 26 can especially be formed by a screen printing layer or a metalization. In this embodiment, the background layer has a dual function, since it acts in each case as a reflective background for both groups of line patterns 72, 74 and 136, 138.

In the manufacture of a design according to FIG. 11, the substrate 122 is first provided with the highly reflective background layer 26, and the substrate prepared in this way is then printed on both sides with the line patterns 72, 74 and 136, 138, respectively. The printing can advantageously occur in a simultaneous process or also in two separate printing steps. Subsequently, the substrate 122 is blind embossed, through which, simultaneously, the congruent embossing patterns 22, 132 are produced on the front and reverse, and the first and second optically variable pattern 20, 130 thus completed. The embossing advantageously occurs with the embossing plate on the side of the background layer 26, but it can, in principle, also occur on the opposite side.

Figure 12:
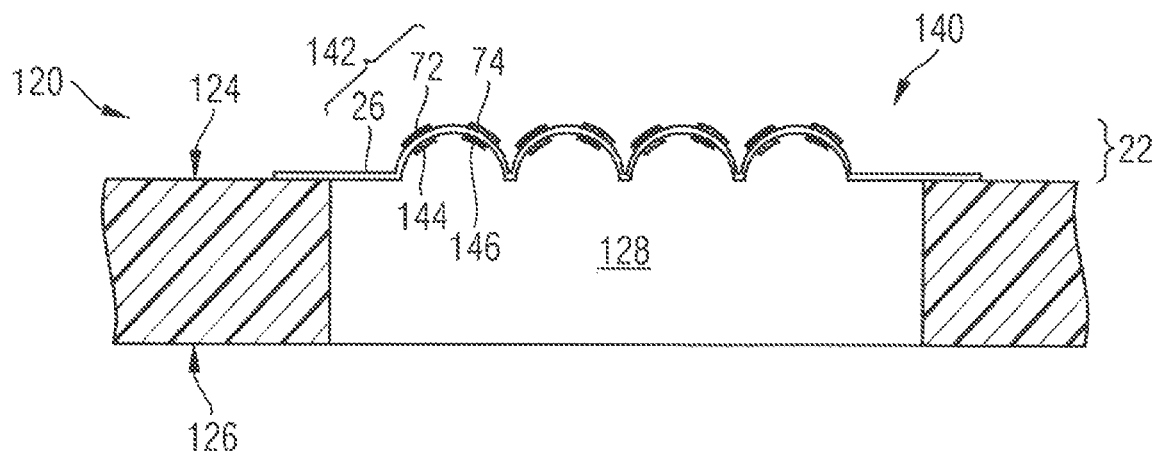

Another two-sided design, illustrated in FIG. 12, utilizes, in a transparent window region 128 of a banknote 120, only one optically variable pattern 140 on the front 124 of the banknote. The reverse 126 can have deformations, as shown for instance in FIG. 2, but in this embodiment, said deformations are not used as embossing patterns of an optically variable reverse-side pattern. The optically variable pattern 140 is formed by a combination of an embossing pattern 22 and a coating 142, the coating 142 comprising, in addition to a highly reflective silver background layer 26, two groups of line grids. As in the above-described exemplary embodiments, a first group of line grids 72, 74 is applied to the background layer 26, while a second group of line grids 144, 146 is arranged below the background layer 26.

In this design, both groups of line grids use the same embossing pattern 22, the elevations 34 acting as small convex mirrors for the line grids 72, 74 arranged on the background layer 26 and when viewed from the front, while they act as small concave mirrors for the line grids 144, 146 arranged below the background layer 26 and when viewed from the reverse. The line grids 72, 74 on the background layer and the line grids 144, 146 below the background layer can, with their phase function $\phi_{on}$ (x,y) or $\phi_{under}$ (x,y), produce identical or different movement effects.

In the designs described so far, due to the contrasting or even reflecting background layer, at least one movement effect is visible in top view of the security element. In the two-sided designs, when viewed from opposing sides, a movement effect is visible in each case in top view, with the movement effects of the opposing sides being able to be identical or different. In all designs, said top-view movement effects could be combined with a see-through piece of information in that the background layer is perforated with point- or line-shaped gaps or also is omitted in large areas. If two background layers are provided, the gaps are provided in at least one of the background layers. In opaque background layers, it can be necessary to omit both background layers in overlay to produce a see-through piece of information.

Figure 13:
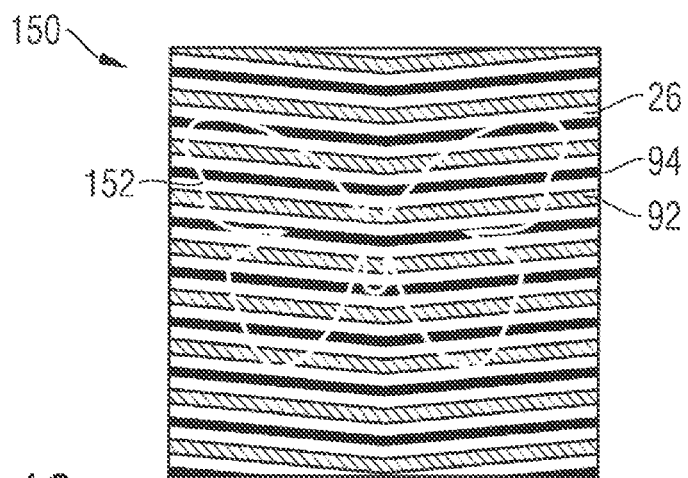

FIG. 13 shows, for illustration, a security element 150 having a highly reflective background layer 26 and two different-colored line grids 92, 94, with the projected embossing elements not being depicted for the sake of simpler illustration. By the action of laser radiation, a contour line 152, in the exemplary embodiment in the form of a butterfly motif, is introduced into the background layer 26 and the overlying line grids 92, 94. The security element 150 thus displays, in addition to the above-described movement effect, when looked through, the contour line 152 of the butterfly motif The background layer 26 can also be removed in large areas through laser impingement, as illustrated in the modification in FIG. 14. In the security element 154 shown there, the highly reflective background layer 26 and the line grids 92, 94 were first applied over the entire surface of the security element 154 and subsequently removed in the region 156 outside the butterfly motif 158 through laser impingement. If, for example, the background layer 26 and the line grids 92, 94 form, together with the embossing pattern not depicted in FIG. 14, a first optically variable pattern that, according to FIG. 11, is combined with a second optically variable pattern on the opposing substrate side, then the two-sided security element displays in each case, in top view, a colored butterfly 158 having colored wings and a movement effect of the kind described above. For example, the line grid can be printed on the front with the colors yellow and blue and on the reverse with the colors red and green, such that the butterfly wings appear with different color gradients depending on the viewing angle and viewing side.

In a two-sided design, in one advantageous embodiment, through the laser impingement, it is possible for only the background layer 26 and the line grids 92, 94 in the front to be removed but not the coating of the reverse.

Figure 14:
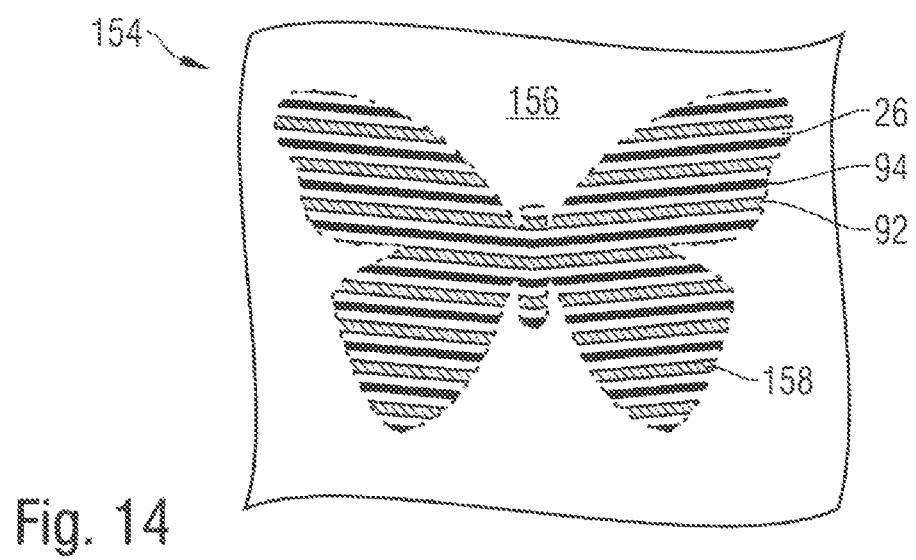

Instead of removing the background layer 26 in large areas through laser impingement, the background layer 26 can also be applied in a desired form, for example in the form of the butterfly motif 158 in FIG. 14. Said approach is suitable especially when there would be larger surface areas to demetalize, but it has the disadvantage that register variations can occur between the background layer 26, imprinted or applied as a foil element, and the imprinted line grids 92, 94.

The background layer 26 can also be applied or metalized with a lower area coverage than 100%, for example 50%, in the form of a fine line or point grid to obtain a partially transmissive background layer and a partially transmissive window region.

Figure 15:
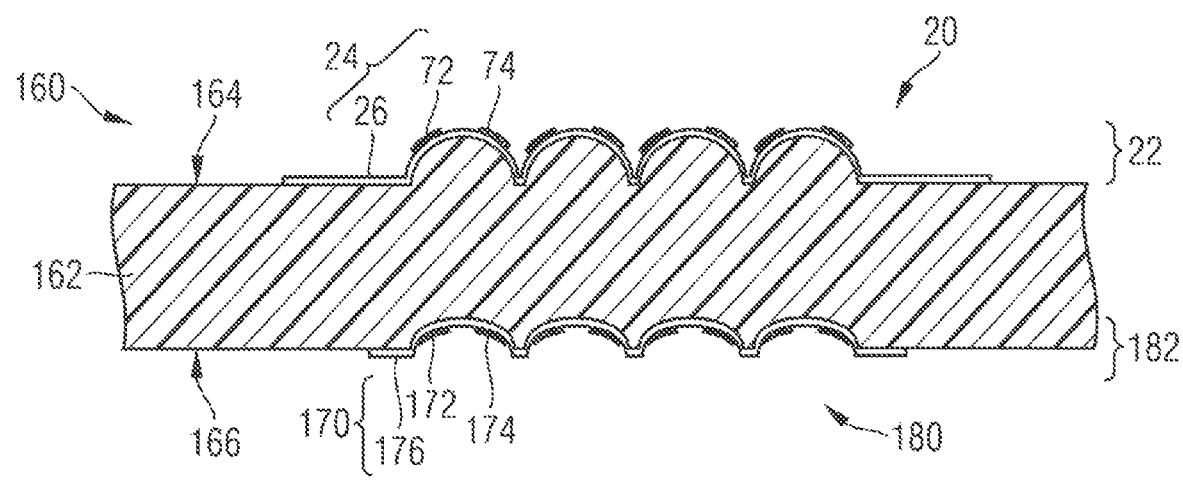

Two-sided designs can be realized not only in transparent, but also in opaque regions of a data carrier. For this, FIG. 15 shows, as an exemplary embodiment, a banknote 160 having an opaque paper substrate 162. On the front 164 of the banknote is arranged a first optically variable pattern 20, of the kind described above, that is formed by a combination of an embossing pattern 22 and a coating 24. The coating 24 comprises, in addition to the highly reflective silver background layer 26, two line grids 72, 74, as described in greater detail in the exemplary embodiment in FIG. 6.

The first optically variable pattern 20 in the front 164 is combined with, arranged on the reverse 166 of the banknote, a second optically variable pattern 180 that comprises a second embossing pattern 182 and a second coating 170 that, in addition to a highly reflective silver background layer 176, comprises two line grids 172, 174.

The second embossing pattern 182 was, as in the exemplary embodiment in FIG. 11, produced simultaneously with the first embossing pattern 22 in the same production step, for example through a blind embossing step, such that the statements made in FIG. 11 regarding the deformations of the reverse and the geometries, inverse to each other, of the embossing patterns 182 and 22 also apply to the exemplary embodiment in FIG. 15.

The background layers 26, 176 can be produced through screen printing twice on the front and reverse of the banknote substrate 162, or also through application of an offset silver, or an application of a silver patch or a silver-plated laminate strip. Also a combination of the methods mentioned may be used. The silver background layers 26, 176 can have an identical or different form, geometry or fine structure.

After the application of the background layers, the substrate prepared in this way is printed on both sides with the line patterns 72, 74 or 172, 174. The printing can again advantageously occur in a simultaneous process or also in two separate printing steps. Subsequently, the substrate 162 is blind embossed, through which, simultaneously, the congruent embossing patterns 22, 182 are produced on the front and reverse, and the two optically variable patterns 20, 180 thus completed. As with the other two-sided designs, the line grids 72, 74 in the front and the line grids 172, 174 in the reverse can, with their phase function $\phi_{VS}(x,y)$ and $\phi_{RS}(x,y)$, respectively, produce identical or different movement effects.

Figure 16:
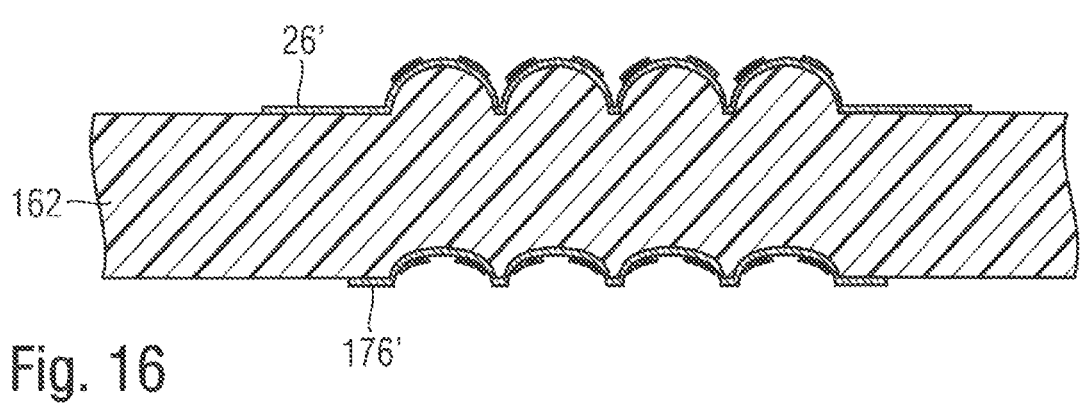

With reference to the modification in FIG. 16, one or both of the background layers 26', 176' can also be developed in the form of a non-highly-reflective layer. As the background layer that contrasts with the line grids, especially the white substrate surface of a banknote paper, the colored surface of a tinted substrate, a glossy adhesion-promoting layer applied to the substrate surface with pigments (e.g. rutile—$TiO_2$) or fillers in screen printing, or a monochrome printing layer applied to the substrate 162 may be used. In the exemplary embodiment in FIG. 16, for instance, the background layer 26' is formed by a monochrome, for example red, printing layer, and the background layer 176' by a monochrome, for example yellow, printing layer. One or both of the background layers 26', 176' can also be formed by the white surface of the banknote substrate 162 itself.

The development of the background layer as non-reflective or reflective to only a small extent and merely contrasting with the line grids may, of course, be used also for designs having only one background layer, as shown for instance in FIG. 2 or 12.

In one design variant, in the line grid, advantageously at least one luminescent ink, preferably a fluorescent ink, is used. Here, luminescent inks are advantageously added to one to three, preferably two of the printing inks used. The security element can then be verified with UV light, the viewer perceiving, for example when waving a UV hand lamp back and forth, a colored movement in the security element, without moving said security element itself.

Figure 17:
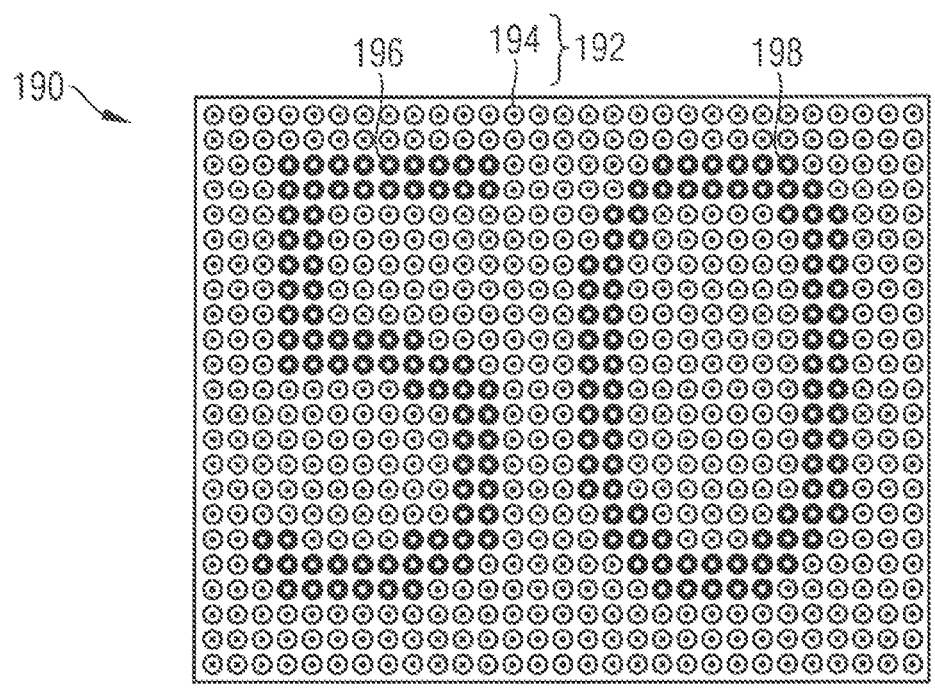

Particularly counterfeit-secure security elements can further be obtained through particular embodiments of the embossing pattern. For this, FIG. 17 shows, in schematic diagram, only the embossing pattern 192 of a security element 190, the embossing pattern 192 including as embossing elements both compressed hemispherical elevations 194 and compressed hemispherical depressions 196. The elevated and depressed embossing elements 194, 196 are arranged in the form of a motif 198, in the exemplary embodiment the numeric string "50". If the embossing pattern 192 is combined with a coating of the kind described above, then a movement effect is created that, due to the opposite optical effect of the elevated and depressed embossing elements, is modified within the motif 198 in such a way that the motif 198 appears clearly visibly at least from certain viewing directions. In particular, the motif 198 can, for example, be not perceptible when viewed perpendicularly from above, while it displays an inverted color sequence to the surroundings at a flat viewing angle. An embossing tool for producing such embossing patterns can be produced, for example, through laser machining of an embossing plate.

Figure 18:
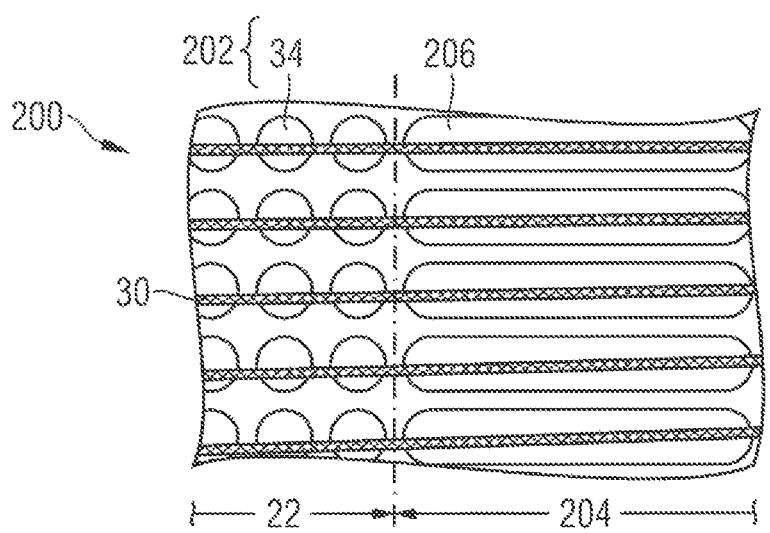

FIG. 18 shows a top view of a section of a security element 200 that, in principle, is designed like the security element 12 in FIGS. 2 and 3. However, the embossing pattern 202 of the security element 200 also comprises, in addition to the above-described two-dimensional grid 22 of compressed hemispherical elevations 34, a sub-region 204 having elongated, elevated embossing elements 206. The embossing elements 206 can be developed to be, for example, elliptical, oval or trough-shaped. In the exemplary embodiment, the elongated embossing elements 206 lie with their longitudinal direction parallel to the x-axis and their transverse direction parallel to the y-axis. Although the different, elongated form of the embossing elements 206 does not, in the sub-region 204 upon tilting in the north-south direction (tilting about the x-axis), lead to perceptible deviations in the appearance produced by the line grid 30, the clearly different form of the embossing elements 206 is easily perceptible, for example with the aid of a microscope, and can in this way be used as a further authenticating feature. Such combinations of spherical and elongated embossing elements lend a security element 200 additional counterfeit protection especially also in that, as explained in greater detail above, appropriate combination lens foils are not commercially available.

Figure 19:
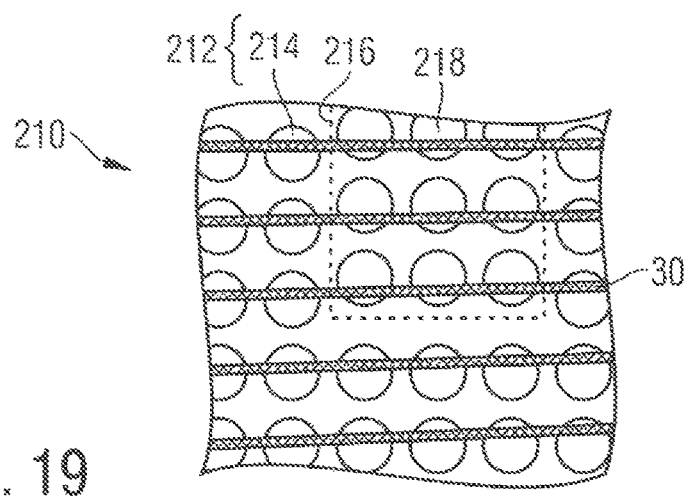

FIG. 19 shows, as a further exemplary embodiment, a security element 210 that, in principle, is designed like the security element 12 in FIGS. 2 and 3, but whose embossing pattern 212 comprises, in addition to the regular two-dimensional grid 22 of embossing elements 214, also a sub-region 216 having embossing elements 218 that are offset against the grid 22. In the exemplary embodiment, the offset embossing elements 218 have the same form as the embossing elements 214, but in general, the offset embossing elements can also have another form or also another dimension or line screen. Due to the phase offset, the sub-region 216 displays an appearance that differs from the surroundings and thus becomes visible as an additional piece of information in the movement feature. If the embossing elements 218 are offset by precisely half of the period length of the embossing element grid, then an inverted colored appearance of the sub-region 216, and thus an easily perceptible piece of information in the security element 210, results.

Figure 20:
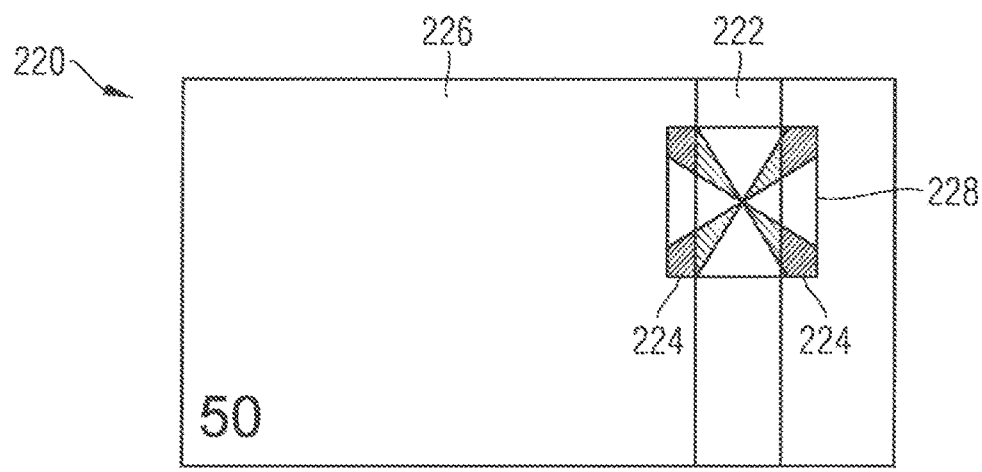

With reference to FIG. 20, the above-mentioned embodiments can also be advantageously combined to achieve a securing of a foil element 222 on a banknote 220. Here, the optically variable security element 228 is developed in such a way that it covers, in addition to a sub-region of the foil element 222, also the regions 224 of the banknote substrate 226 adjoining the foil element 222. For this, a glossy silver background layer is provided on the foil element 222, while the contrasting background layer in the regions 224 adjoining the foil element is not a glossy background layer, but rather is formed, for example, by the white substrate surface or a colored printing layer. Further, at least one line grid is provided that extends over both the foil element 222 and the adjoining regions 224. The banknote substrate 226 is blind embossed together with the applied foil element to produce a through embossing pattern. In this way, the foil element 222 is securely bound to the banknote substrate 226, since a manipulation of the foil element immediately attracts attention due to the extension of the security element 228 to the adjoining regions 224.

The security element 228 can also be arranged in the region of a through opening in the banknote 220 that is covered by the foil element 222. In this case, the security element 228 is advantageously developed having a two-sided design, for instance according to FIG. 11, 12, 15 or 16, such that a movement effect is visible in the region of the opening also upon viewing the reverse.

Figure 21:
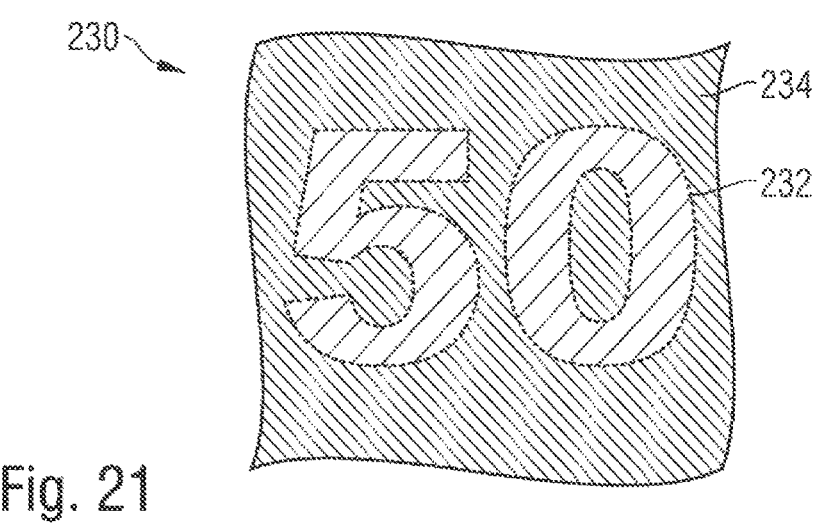

The coating of the security elements described can also comprise multiple sub-regions in which the line grids produce different movement effects. With reference to FIG. 21, the security element 230 comprises a first sub-region 232, in the form of the value numeral "50", whose line grid produces a tilt effect. The surrounding sub-region 234, in contrast, is covered with a line grid having a different movement effect, for example a rotation effect according to FIG. 4. When the security element 230 is tilted, the value numeral "50" is therefore visible or not visible depending on the viewing angle, while the surroundings 236 of the value numeral display rotating blades.

Figure 22:
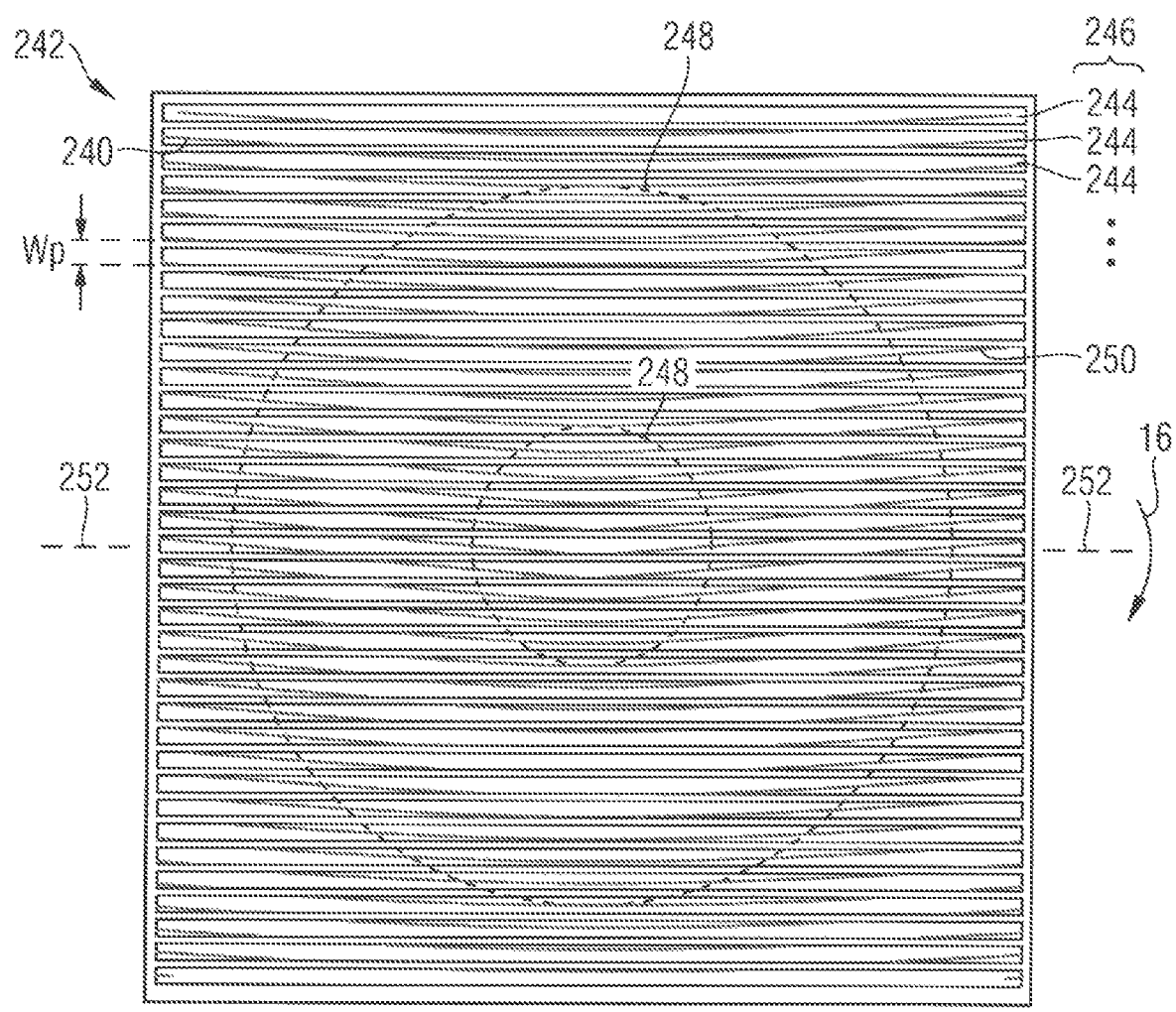

In addition to two-dimensional grids, the security elements described can also include embossing patterns having a one-dimensional grid. FIG. 22 illustrates this using the example of a security element 242 that, similar to the exemplary embodiment in FIG. 5, displays a pump effect. Specifically, FIG. 22 shows, in two-dimensional projection, a section on the associated line grid 240 of the security element 242 having a plurality of elongated elevated embossing elements 244 that are arranged substantially parallel to each other in a one-dimensional grid 246 of line screen $W_P$.

The associated line grid 240 consists of a plurality of lines 250 that are obtained according to the phase function $\phi_2$ (x,y) specified in FIG. 5. As illustrated in FIG. 22, the coating having the line grid 240 is combined with the embossing pattern of the embossing elements 244 in such a way that substantially on every elongated embossing element 244 lies at least one line 250 of the line grid 240. Here, the phase function $\phi_2$ (x,y) describes for every point (x,y) the local position and orientation of the line 250 on the embossing element 244. As can be further seen in FIG. 22, a line 250 can, due to its specific progression, extend across multiple of the elongated embossing elements 244 such that, over each of said elongated embossing elements 244 lies, in each case, only one sub-region of said line 250.

Similarly as in the exemplary embodiment in FIG. 5, when the security element 242 is viewed perpendicularly, the portions of the lines 250 that lie in the middle of ($\phi_2$=0.5) of the elevated embossing elements 244 appear most markedly, while the line portions that lie on the top and bottom edges of the embossing elements 244 visually recede. As can be seen in FIG. 22, for the phase function $\phi_2$, the line portions that lie in the middle of the embossing elements 244 are arranged substantially on concentric circles 248 having radii of $5*W_p$, $15*W_p$, $25*W_p$, etc. When viewed perpendicularly, the security element 242 thus displays a series of concentric circles having the diameters mentioned.

If the security element 242 is now tilted downward in the tilt direction 16, that is, a tilting about an axis 252 that lies parallel to the elongated embossing elements 244 is carried out, then the first line portions that initially lie at the highest point end up, from the viewer's perspective, at the bottom edges of the embossing elements 244 and thus visually recede, while the line portions that previously lay at the top edges are tilted to the highest point and dominate the visual appearance. In other words, the line portions that previously were visible now appear to the viewer to be increasingly less dominant, whereas the line portions that previously lay at the top edges stand out more clearly due to the tilting 16. As can be seen in FIG. 22, the associated regions of the embossing elements 244 lie on somewhat large concentric circles, for example having radii $7*W_p$, $17*W_p$, etc., such that, due to the tilting 16, the concentric circles 248 appear to enlarge. Accordingly, by tilting the security element 242 in the opposite direction, an apparent shrinking of the concentric circles 248 results such that, by tilting the security element 242 back and forth in the tilt direction 16, the desired pump effect is created.

The lines 250 run substantially parallel to the longitudinal direction 252 of the elongated embossing elements 244 for an impressive movement effect. Here, the angle that the lines 250 include with the elongated embossing elements 244, in the exemplary embodiment for example less than 5°, impacts especially the speed of the movement effect. Thus, in the event that the lines 250 include, with the elongated embossing elements 244, an angle that is larger (or smaller) compared with the exemplary embodiment in FIG. 22, the radii of the concentric circles 248 shrink (or enlarge) accordingly, and the pump effect created by tilting the security element 252 back and forth in the tilt direction 16 results in an acceleration (or deceleration).

Due to the elongated and thus strongly asymmetrical form of the embossing elements 244 and of the line grid 240, the movement effect described occurs only upon tilting about the axis 252 parallel to the longitudinal axis of the embossing elements, while no movement effect is created upon tilting about an axis perpendicular thereto.

The exemplary embodiments shown are not conclusive. In particular, combinations of the security element shown with other security features are provided. For example, on a security document, the security element can be combined with further optically variable elements that, from different viewing angles, convey to the viewer a different image impression and, depending on the viewing angle, display for example another color or brightness impression and/or another graphic motif.

It is particularly advantageous when the security element shown takes up the movement direction and/or the forms of the further optically variable element(s). Thus, for instance, through a hologram strip, upon tilting, a movement of a motif in a certain direction can be represented that is taken up or similarly rendered by the security element according to the present invention. Also an amplification of the movement impression can be achieved by a further security feature, for example via an opposite movement of the motif depicted by the hologram to the security element according to the present invention.

LIST OF REFERENCE SIGNS

10 Banknote
12 Security element
14 Blade pattern
16 Tilting
18 Rotation movement
20 Optically variable pattern
22 Embossing pattern
24 Coating
26 Highly reflective background layer
26' Monochrome background layer
28 Banknote substrate
30 Line grid
32 Lines
34 Embossing elements
36 Line segments
40, 42, 44 Viewing directions
50 Diagonals
52 Rotated diagonals
60 Line grid
62 Security element
64 Concentric circles
70 Security element
72, 74 Line grids
76 Tilt direction
82, 84 Blades
86, 88 Rotation directions
90 Security element
92, 94 Line grids
96 Tilt direction
98-L, 98-R Sub-regions
100 Security element
102, 104 Line grids
106, 108 Tilt directions
110 Security element
112 Sub-region
120 Polymer banknote
122 Substrate
124 Front
126 Reverse
128 Window region
130 Second optically variable pattern
132 Second embossing pattern
134 Second coating
135 Depression
136, 138 Line grids
140 Optically variable pattern
142 Coating
144, 146 Line grids
150 Security element
152 Contour line
154 Security element
156 Region outside the butterfly motif
158 Butterfly motif
160 Banknote
162 Paper substrate
164 Front
166 Reverse
170 Second coating
172, 174 Line grids
176, 176' Background layer
180 Second optically variable pattern
182 Second embossing pattern
190 Security element
192 Embossing pattern
194 Elevations
196 Depressions
198 Motif
200 Security element
202 Embossing pattern
204 Sub-region
206 Elongated embossing elements
210 Security element
212 Embossing pattern
214 Embossing elements
216 Sub-region
218 Offset embossing elements
220 Banknote
222 Foil element
224 Adjoining regions
226 Banknote substrate
228 Optically variable security element
230 Security element
232, 234 Sub-regions
240 Line grid
242 Security element
244 Elongated elevated embossing elements
246 One-dimensional grid
248 Concentric circles
250 Lines
252 Axis

The invention claimed is:

1. An optically variable security element for securing valuable articles, having a substrate having opposing first and second main surfaces and, arranged on the first main surface, an optically variable pattern that comprises an embossing pattern and a coating, wherein the coating comprises at least one imprinted, one-dimensional line grid and one background layer that contrasts with the line grid, the embossing pattern comprises a two-dimensional grid of elevated and/or depressed embossing elements, the coating and the embossing pattern are combined in such a way that on a majority of the embossing elements lies at least one line segment of a line in the line grid, wherein due to a specific progression of lines in the line grid, on some of the embossing elements no line segment comes to lie, and at least two of the parameters 'position of the line segment on the embossing element', 'orientation of the line segment on the embossing element' and 'line width of the line segment' vary location dependently across the dimension of the optically variable pattern such that, due to the line grid, a movement effect is created when the security element is tilted.

2. The security element according to claim 1, wherein the contrasting background layer is formed by a highly reflective background layer.

3. The security element according to claim 2, wherein, due to the highly reflective background layer, each embossing element acts as a small concave or convex mirror.

4. The security element according to claim 1, wherein the contrasting background layer is formed by a colored background layer, a glossy background layer or the surface of the substrate itself.

5. The security element according to claim 4, wherein the line grid is developed on the contrasting background layer.

6. The security element according to claim 1, wherein the substrate is transparent or translucent, at least in the region of the optically variable pattern arranged on the first main surface.

7. The security element according to claim 6, wherein the coating comprises at least one further line grid that is arranged below the background layer and that contrasts with the background layer,
wherein on the majority of the embossing elements there is/lies at least one line segment of a line in the further line grid, wherein due to a specific progression of lines in the line grid, on some of the embossing elements no line segment comes to lie, and
for the further line grid, at least one of the parameters 'position of the line segment on the embossing element', 'orientation of the line segment on the embossing element' and 'form of the line segment' varying location dependently across the dimension of the optically variable pattern such that, due to the further line grid, a movement effect is created when the security element is tilted.

8. The security element according to claim 1, wherein the optically variable pattern arranged on the first main surface is combined with, arranged on the second main surface of the substrate, a second optically variable pattern that comprises a second embossing pattern and a second coating,
the second embossing pattern being developed to be congruent but inverse to the first embossing pattern of the first main surface,
the second coating comprising at least one imprinted line grid,
the second coating and the second embossing pattern being combined in such a way that on a majority of the embossing elements of the second embossing pattern lies at least one line segment of a line in the line grid of the second coating, wherein due to a specific progression of lines in the line grid, on some of the embossing elements no line segment comes to lie, and
for the line grid of the second coating, at least one of the parameters 'position of the line segment on the embossing element', 'orientation of the line segment on the embossing element' and 'form of the line segment' varying location dependently across the dimension of the optically variable pattern such that, due to the line grid of the second coating, a movement effect is created when the security element is tilted.

9. The security element according to claim 8, wherein the second coating comprises a second background layer that contrasts with the line grid.

10. The security element according to claim 1, wherein the contrasting background layer is perforated with point- or line-shaped gaps or is omitted in large areas.

11. The security element according to claim 1, wherein the embossing elements are formed by elevated or depressed round structures.

12. The security element according to claim 1, wherein the embossing pattern includes both elevated and depressed embossing elements, and the elevated and depressed embossing elements are arranged in the form of a pattern, characters or a code.

13. The security element according to claim 1, wherein the embossing pattern comprises, besides the two-dimensional grid mentioned, at least one sub-region having elongated elevated or depressed embossing elements.

14. The security element according to claim 1, wherein the embossing pattern comprises, besides the two-dimensional grid of embossing elements mentioned, at least one sub-region having embossing elements offset against the grid.

15. The security element according to claim 1, wherein the two-dimensional grid of embossing elements is a regular two-dimensional grid.

16. The security element according to claim 1, wherein the line grid includes a plurality of non-intersecting, almost, but not completely, parallel lines.

17. The security element according to claim 1, wherein the position of a line segment on an embossing element is given in each case by a phase function $\phi(x,y)$ that depends on the position $(x,y)$ of the embossing element in the optically variable pattern and whose function value specifies the relative position of the line segment on the embossing element perpendicular to the length dimension of the line segment, normalized to the unit interval $[0, 1]$, and the phase function $\phi(x,y)$ varying location dependently in such a way that a movement effect is created when the security element is tilted.

18. The security element according to claim 17, wherein the phase function $\phi(x,y)$ depends directly on the angle between the position $(x,y)$ of the embossing element and a fixed reference point $(x_0, y_0)$ in the optically variable pattern such that, when the security element is tilted, a rotation effect about the reference point $(x_0, y_0)$ is created, the phase function being given by $$\phi(x,y)=\mathrm{mod}((\alpha+k*\arg((x-x_0)+i(y-y_0))/(2\pi),1)$$

with an integer $k \neq 0$ and an offset angle $\alpha$.

19. The security element according to claim 1, wherein the line grid has an average line screen width $W_L$ and the embossing elements are arranged in a grid whose line screen has, perpendicular or at 60° to the line grid, a line screen width $W_P$ that is substantially equal to the average line screen width $W_L$.

20. The security element according to claim 1, wherein the coating comprises two or more line grids, the parameters 'position of the line segment on the embossing element', 'orientation of the line segment on the embossing element' and 'form of the line segment' varying independently of each other for the line segments of each line grid.

21. The security element according to claim 20, wherein the two or more line grids produce different movement effects in identical or different directions.

22. The security element according to claim 20, wherein the lines of different line grids are applied with different colors.

23. The security element according to claim 20, wherein the two or more line grids have a predominant direction defined by the line direction, and the directions of the two or more line grids together include an angle of 60° or 90°, or in that the two or more line grids together include an angle of 0° and are present parallel to each other at a distance.

24. The security element according to claim 20, wherein the two or more line grids produce identical movement effects in identical or different directions.

25. The security element according to claim 1, wherein the security element comprises, in the form of patterns, characters or a code, a sub-region that remains static when the security element is tilted.

26. The security element according to claim 25, wherein the line grid(s) in the sub-region are omitted such that, in the sub-region, no line segments are present on the embossing elements and the sub-region remains static when the security element is tilted.

27. The security element according to claim 1, wherein the parameter 'orientation of the line segment' varies location dependently across the dimension of the optically variable pattern, and wherein each line segment of the line grid is a continuous line segment.

28. A method for manufacturing an optically variable security, comprising the steps of:
providing a substrate having opposing first and second main surfaces;
producing a coating of the first main surface in that at least one, one-dimensional line grid and one background layer that contrasts with the line grid are applied to the first main surface of the substrate;
in an embossing step, producing an embossing on the first main surface in that a two-dimensional grid of elevated and/or depressed embossing elements is developed on the first main surface;
combining the coating and the embossing pattern in such a way that on a majority of the embossing elements lies at least one line segment of a line in the line grid, wherein due to a specific progression of lines in the line grid, on some of the embossing elements no line segment comes to lie; and
at least two of the parameters 'position of the line segment on the embossing element', 'orientation of the line segment on the embossing element' and 'line width of the line segment' varying location dependently across the dimension of the optically variable pattern such that, due to the line grid, a movement effect is created when the security element is tilted.

29. The method according to claim 28, wherein the contrasting background layer is applied contiguously to the first main surface, and the line grid is imprinted on the contrasting background layer.

30. The method according to claim 28, wherein the line grid is imprinted on the first main surface, the contrasting background layer is applied contiguously over the line grid and, subsequently, the line grid is exposed through removal of the background layer in some regions.

31. The method according to claim 28, wherein the embossing pattern of the first main surface is produced by a blind embossing.

32. The method according to claim 28, further comprising the steps of:
producing a second coating on the second main surface in that at least one second line grid is applied to the second main surface of the substrate,
in the embossing step, together with the embossing pattern on the first main surface, simultaneously, developing a congruent embossing pattern having the inverse geometry on the second main surface,
combining the second coating and the second embossing pattern in such a way that on a majority of the embossing elements lies at least one line segment of a line in the line grid of the second coating, wherein due to a specific progression of lines in the line grid, on some of the embossing elements no line segment comes to lie; and
for the line grid of the second coating, at least one of the parameters 'position of the line segment on the embossing element', 'orientation of the line segment on the embossing element' and 'form of the line segment' varies location dependently across the dimension of the optically variable pattern such that, due to the line grid of the second coating a movement effect, is created when the security element is tilted.

* * * * *

UNITED STATES PATENT AND TRADEMARK OFFICE
CERTIFICATE OF CORRECTION

PATENT NO. : 11,511,559 B2
APPLICATION NO. : 15/535368
DATED : November 29, 2022
INVENTOR(S) : Christian Fuhse et al.

It is certified that error appears in the above-identified patent and that said Letters Patent is hereby corrected as shown below:

In the Claims

Column 30
Claim 18, Line 51, change "$\phi(x,y) = \text{mod}((\alpha + k*\arg((x-x_0)+i(y-y_0))/(2\pi), 1)$" to
– $\phi(x,y) = \text{mod}((\alpha + k*\arg((x-x_0)+i(y-y_0))/(2\pi)), 1)$ –

Signed and Sealed this
Twenty-eighth Day of February, 2023

Katherine Kelly Vidal
*Director of the United States Patent and Trademark Office*